United States Patent
McNiel et al.

(10) Patent No.: US 12,058,991 B2
(45) Date of Patent: Aug. 13, 2024

(54) LURE CONTAINERS

(71) Applicant: Solution Products, LLC., Frisco, TX (US)

(72) Inventors: Gary McNiel, Frisco, TX (US); Deborah McNiel, Frisco, TX (US)

(73) Assignee: Solution Products, LLC., Frisco, TX (US)

( * ) Notice: Subject to any disclaimer, the term of this patent is extended or adjusted under 35 U.S.C. 154(b) by 468 days.

(21) Appl. No.: 16/853,273

(22) Filed: Apr. 20, 2020

(65) Prior Publication Data

US 2020/0359614 A1 Nov. 19, 2020

Related U.S. Application Data

(60) Provisional application No. 62/849,553, filed on May 17, 2019.

(51) Int. Cl.
*A01K 97/06* (2006.01)
*B65D 43/16* (2006.01)
*B65D 43/22* (2006.01)

(52) U.S. Cl.
CPC .............. *A01K 97/06* (2013.01); *B65D 43/16* (2013.01); *B65D 43/22* (2013.01)

(58) Field of Classification Search
CPC ...... A01K 97/06; A01K 87/009; B65D 43/16; B65D 43/22; B65D 45/16; B65D 45/18; B65D 2251/1016

(Continued)

(56) References Cited

U.S. PATENT DOCUMENTS 799,844 A * 9/1905 Fuller .................... A24F 27/10
220/829
1,216,069 A 2/1917 Cammack
(Continued)

FOREIGN PATENT DOCUMENTS

CA 2724956 A1 4/2012
CN 2873665 Y 2/2007
(Continued)

OTHER PUBLICATIONS

International Search Report and Written Opinion for Corresponding Application No. PCT/US20/29024, mailed Jul. 9, 2020.
(Continued)

*Primary Examiner* — Timothy D Collins
*Assistant Examiner* — Maria E Graber
(74) *Attorney, Agent, or Firm* — Harness, Dickey & Pierce, P.L.C.

(57) ABSTRACT

Apparatuses for protecting fishing lures and hooks are disclosed. In one example embodiment, a container for protecting a fishing lure may include a body having a first end and a second end and forming a compartment. The body may be cylindrical. The container may also include a cap and a latch. The cap may be attached to the body and may be used to enclose the first end of the body. The latch may be positioned on the second end of the body. The cap may include a slot extending from an edge of the cap to a center of the cap. The body of the container may include a catch, and the cap may further include a hitch positioned proximate to an edge of the cap and configured to releasably couple with the catch.

5 Claims, 14 Drawing Sheets

(58) Field of Classification Search
USPC ......... 43/57.1, 25.2, 26, 54.1; 220/780, 782, 220/787, 789, 790, 793, 794, 795, 796, 220/798, 799, 800, 801, 375, 833, 810, 220/324, 315

See application file for complete search history.

(56) References Cited

U.S. PATENT DOCUMENTS

| | | | | |
|---|---|---|---|---|
| 2,699,623 | A | | 1/1955 | Pragalz |
| 2,729,913 | A | * | 1/1956 | Holwerda ............... A01K 97/06 206/315.11 |
| 3,224,134 | A | * | 12/1965 | Holcombe ............ A01K 97/06 43/57.1 |
| 3,949,511 | A | * | 4/1976 | Goldhaft ................ A01K 97/06 43/57.1 |
| 3,998,354 | A | * | 12/1976 | Song ...................... B65D 39/04 220/834 |
| 4,022,352 | A | * | 5/1977 | Pehr .................. B65D 47/0838 222/546 |
| 4,049,165 | A | * | 9/1977 | Goldhaft ................ A01K 89/08 24/3.13 |
| 4,203,245 | A | * | 5/1980 | Peterson ................ A01K 97/06 D22/199 |
| 4,383,385 | A | | 5/1983 | Myers |
| 4,681,220 | A | * | 7/1987 | Beneke .................. A01K 97/06 206/315.11 |
| 4,757,637 | A | * | 7/1988 | Christensen ........... A01K 93/00 43/57.1 |
| 4,879,832 | A | | 11/1989 | Nelson |
| 4,884,357 | A | * | 12/1989 | Clifford ................ A01K 97/06 43/42.37 |
| 5,031,784 | A | * | 7/1991 | Wright ................. B65D 50/045 220/283 |
| 5,036,617 | A | | 8/1991 | Waldrip |
| 5,123,199 | A | * | 6/1992 | Lysohir .................. A01K 97/06 43/57.1 |
| 5,199,208 | A | | 4/1993 | Matchette |
| D345,779 | S | * | 4/1994 | Baggett ........................ D22/139 |
| 5,475,942 | A | | 12/1995 | Tatum |
| 5,507,114 | A | * | 4/1996 | Stricker ................ A01K 97/04 62/457.2 |
| D373,614 | S | | 9/1996 | Bevill |
| 5,560,140 | A | * | 10/1996 | Nafziger, Jr. .......... A01K 85/01 43/42.22 |
| D399,912 | S | * | 10/1998 | Kopp, III ..................... D22/139 |
| 5,927,535 | A | * | 7/1999 | Goth .................... B65D 50/046 220/837 |
| 6,023,876 | A | | 2/2000 | Haddad et al. |
| 6,082,041 | A | * | 7/2000 | Croop .................... A01K 97/06 43/57.1 |
| 6,206,221 | B1 | * | 3/2001 | Bando ................ B65D 47/0871 220/829 |
| 6,273,309 | B1 | * | 8/2001 | Oppelt .................. A01K 97/06 224/199 |
| 6,691,448 | B2 | * | 2/2004 | Jones .................... A01K 97/06 43/42.4 |
| 6,711,847 | B1 | | 3/2004 | Udelhoven |
| 6,783,025 | B2 | * | 8/2004 | Lohn .................. B01L 3/50825 220/806 |
| 6,866,164 | B2 | * | 3/2005 | Branson ............. B65D 47/0814 222/153.14 |
| 7,299,582 | B1 | | 11/2007 | Whitehead |
| D586,876 | S | | 2/2009 | Kern |
| 7,587,855 | B2 | | 9/2009 | Konopa |
| 7,703,234 | B2 | * | 4/2010 | Dodge .................. A01K 97/06 43/25.2 |
| D663,378 | S | | 7/2012 | Osman |
| 8,590,734 | B2 | * | 11/2013 | Giraud ................ B65D 50/045 220/4.23 |
| 8,746,957 | B2 | * | 6/2014 | Garman ................ A47J 43/0711 220/839 |
| D709,589 | S | | 7/2014 | Zebny |
| D712,005 | S | | 8/2014 | De Luna |
| D732,684 | S | * | 6/2015 | Ooi ............................. D24/224 |
| 9,440,774 | B2 | * | 9/2016 | Schick ............... B65D 77/0493 |
| 9,533,803 | B1 | * | 1/2017 | Giraud ................ B65D 50/06 |
| 9,538,737 | B2 | * | 1/2017 | Jubinville ............ A01K 97/06 |
| D783,120 | S | | 4/2017 | Martin et al. |
| D787,146 | S | * | 5/2017 | Kassel ............................. D34/8 |
| D881,410 | S | * | 4/2020 | Motadel ...................... D24/224 |
| D963,105 | S | * | 9/2022 | Phelps .......................... D22/136 |
| 11,433,391 | B2 | * | 9/2022 | Motadel ............... B01L 3/5082 |
| 2002/0079313 | A1 | * | 6/2002 | Grayson ................ A01K 97/06 43/57.1 |
| 2002/0104253 | A1 | * | 8/2002 | Terry ..................... A01K 97/06 43/57.1 |
| 2004/0124200 | A1 | * | 7/2004 | Yuhara ................ A45D 33/006 220/849 |
| 2005/0061815 | A1 | * | 3/2005 | Wong ..................... B65D 51/04 220/281 |
| 2005/0155275 | A1 | * | 7/2005 | Keksi ..................... A01K 97/06 43/54.1 |
| 2005/0160657 | A1 | * | 7/2005 | Dodge ................... A01K 97/06 43/25.2 |
| 2005/0178042 | A1 | * | 8/2005 | Dodge ................... A01K 97/06 43/57.1 |
| 2007/0157505 | A1 | * | 7/2007 | Dodge ................... A01K 97/06 43/57.1 |
| 2009/0090712 | A1 | * | 4/2009 | Vovan .................... B65D 21/02 220/793 |
| 2009/0230142 | A1 | * | 9/2009 | Sheahan ................ B65D 55/16 220/810 |
| 2010/0031678 | A1 | * | 2/2010 | Roman ..................... F25D 3/12 248/213.2 |
| 2010/0257771 | A1 | * | 10/2010 | Debono ................ A01K 97/06 43/54.1 |
| 2010/0307939 | A1 | * | 12/2010 | Schmitt .................. A01K 97/06 220/628 |
| 2011/0017738 | A1 | * | 1/2011 | Sato ........................ B60R 16/06 220/849 |
| 2011/0240514 | A1 | * | 10/2011 | Bandoh .................. B65D 43/16 206/494 |
| 2012/0102814 | A1 | | 5/2012 | Christensen |
| 2013/0168394 | A1 | * | 7/2013 | Messier ............... B65D 43/162 220/780 |
| 2013/0248531 | A1 | * | 9/2013 | Lane ....................... A47J 47/14 220/849 |
| 2015/0143740 | A1 | * | 5/2015 | Kelly ..................... A01K 97/06 43/54.1 |
| 2015/0291324 | A1 | * | 10/2015 | Van Alfen .......... B65D 47/0804 220/810 |
| 2016/0200485 | A1 | * | 7/2016 | Quinones ........... B65D 43/0225 220/254.5 |
| 2016/0309879 | A1 | * | 10/2016 | Zhang .................. A45D 33/003 |
| 2017/0066575 | A1 | * | 3/2017 | Leopold ............. B65D 43/0225 |
| 2018/0014520 | A1 | * | 1/2018 | Langley ................. A45F 5/00 |
| 2021/0039843 | A1 | * | 2/2021 | Kouba .................. B65D 43/169 |
| 2023/0286707 | A1 | * | 9/2023 | Hice ...................... B65D 50/04 220/833 |

FOREIGN PATENT DOCUMENTS

| | | | | |
|---|---|---|---|---|
| GB | 2187721 | A | * 9/1987 | ............. A01K 97/06 |
| GB | 2284335 | A | * 6/1995 | ............. A01K 85/01 |
| JP | 1993276852 | | * 10/1993 | |
| JP | 1999318301 | | * 11/1999 | |
| JP | H11318301 | A | 11/1999 | |
| WO | 2014116622 | A1 | 7/2014 | |

OTHER PUBLICATIONS

The Hook Safe, http://thehooksafe.com/ (last visited Jul. 15, 2020).
Chinese First Office Action Corresponding to Application No. 202080036719.4, mailed Oct. 27, 2022.
Chinese Second Office Action Corresponding to Application No. 202080036719.4, mailed Jun. 12, 2023.

(56) References Cited

OTHER PUBLICATIONS

Chinese Decision of Rejection and English Translation Corresponding to Application No. 202080036719.4, mailed Sep. 28, 2023.

* cited by examiner

LURE CONTAINERS

RELATED APPLICATION

This application claims the benefit, under 35 U.S.C. § 119(e), of the filing of U.S. Provisional Patent Application Ser. No. 62/849,553 entitled "LURE CONTAINERS," filed May 17, 2019, which is incorporated herein by reference for all purposes.

BACKGROUND OF THE INVENTION

1. Field of the Invention

The present invention relates to fishing equipment, and particularly to containers that can enclose fishing hooks and lures.

2. Description of the Related Art

Sport and recreational fishing equipment often includes rod and reel fishing sets with an assortment of natural and artificial fishing baits and lures. Artificial fishing lures are beneficial as they can be reused to catch multiple fish. Fishing lures come in a variety of styles, including spinnerbait, crankbait, spoons, jigs, and buzzbait lures. Each of these types of artificial fishing lures typically comprises at least one exposed barbed hook, which can present a hazard to anyone in the vicinity if not properly handled. Thus, improvements to safety and usability of fishing equipment continue to benefit anglers of all kinds.

SUMMARY OF THE INVENTION

New and useful apparatuses for enclosing fishing lures and hooks are set forth in the appended claims. Illustrative embodiments are also provided to enable a person skilled in the art to make and use the claimed subject matter.

Exemplary protective apparatuses may enclose fishing hooks on a line, serving as a protective guard and preventing the one or more sharp, and possibly barbed, fishing hooks from becoming entangled in fishing lines and other associated fishing equipment. The protective enclosures may also prevent hooks associated with a lure from catching on and tearing exposed flesh. The exemplary lure containers may also be capable of being secured to other equipment, such as a guide loop of a fishing rod, and may be operated with one hand.

For example, in some embodiments, a container may be fabricated from a polycarbonate material as an elongated cylinder with a rounded, solid closed end. An eye-hook may be molded to the closed end, and a lid or cap with an elongated slot from the edge of the cap to the center of the cap may be coupled to the opposite end. In some embodiments, the slot may be a V-notch to prevent hooks or lures from protruding through the cap. In some embodiments, the cap may be coupled to the opposite end with a hinge, and may have a snap-type fitting configured to engage the cylinder. The cylinder may be fabricated in a variety of sizes to accommodate varied sizes of hooks and lures. Some embodiments of the container may comprise a hollow cylinder, without hinges or fasteners. A snap-type or single-hinged cap can allow a hook or lure to be put into the container. The eye-hook can be sized to allow easy fastening to a reel, rod, or other gear.

In some examples, a flat side on the cylinder may allow a molded, fixed hinge to connect the cylinder to the cap. The molded hinge may be flexible, allowing the cap to open fully while still attached. An over-sized rim on the cap can allow the cap to be opened with a thumb or finger. The eye-hook can be oriented ninety degrees out from the flat side.

More generally, a container for protecting a fishing lure may include a body, a cap, and a hinge. The body may include a side wall defining a cavity having a longitudinal axis, a first end defining an opening transverse to the longitudinal axis, and a second end opposite the first end. The cap may be configured to be disposed over the opening to secure the fishing hook in the cavity. The cap may additionally include a slot, which may be configured to receive a fishing line. The hinge may couple the cap to the body proximate the opening, and may have an axis of rotation that is orthogonal to the longitudinal axis. In some embodiments, the side wall may have at least one flat surface, the cap may have at least one straight edge aligned with the flat surface, and the hinge may couple the straight edge to the flat surface. The container may also include a latch positioned on the second end. The container may further include a hitch and catch configured to engage with each other to secure the cap to the body of the container. For example, the container may include a groove formed on an interior surface of the side wall proximate the first end, and may also include a protrusion on an interior surface of the cap that is configured to interface with the groove under a lip of the first end of the body.

In additional embodiments, a fishing lure enclosure may include a container, a lid, and a latch. The container may have an open end and a closed end. The lid may be movably attached to the container proximate the open end and may be operable to enclose the open end. The latch may be positioned on the container proximate to the closed end. In some embodiments, the lid may further include an opening adapted to allow the fishing line to pass through the lid. In some embodiments, the closed end may be hemispherical.

In some further embodiments, a container for a fishing hook or lure on a line may include a cylinder forming a compartment, a catch formed on the cylinder, a circular cap, and a latch. The cylinder may have an open end and a closed end, wherein the closed end is hemispherical. The catch may be formed on the cylinder at the open end, and the circular cap may be hingedly attached to the cylinder at the open end. The circular cap may include a hitch configured to releasably couple with the catch. The latch may be attached to the closed end of the cylinder. The circular cap may further include a slot extending from a center of the circular cap to an edge of the circular cap.

In some further embodiments, a container for a fishing hook on a line may include a body, a cap, and a latch. The body may include a side wall defining a cavity having a longitudinal axis, a first open end, and a second closed end. The cap may be coupled to the first open end of the body. The cap may be configured to be disposed over the first open end to secure the fishing hook in the cavity. The latch may extend from the second closed end.

Objectives, advantages, and a preferred mode of making and using the claimed subject matter may be understood best by reference to the accompanying drawings in conjunction with the following detailed description of the illustrative embodiments.

BRIEF DESCRIPTION OF THE DRAWINGS

Throughout the several views, like elements may be referenced using like reference numbers. The elements in the figures are not drawn to scale, and some dimensions may be exaggerated for clarity.

DETAILED DESCRIPTION OF THE INVENTION

The following description of example embodiments provides information that enables a person skilled in the art to make and use the subject matter set forth in the appended claims, but it may omit certain details already well-known in the art. The following detailed description is, therefore, to be taken as illustrative and not limiting.

Figure 1:
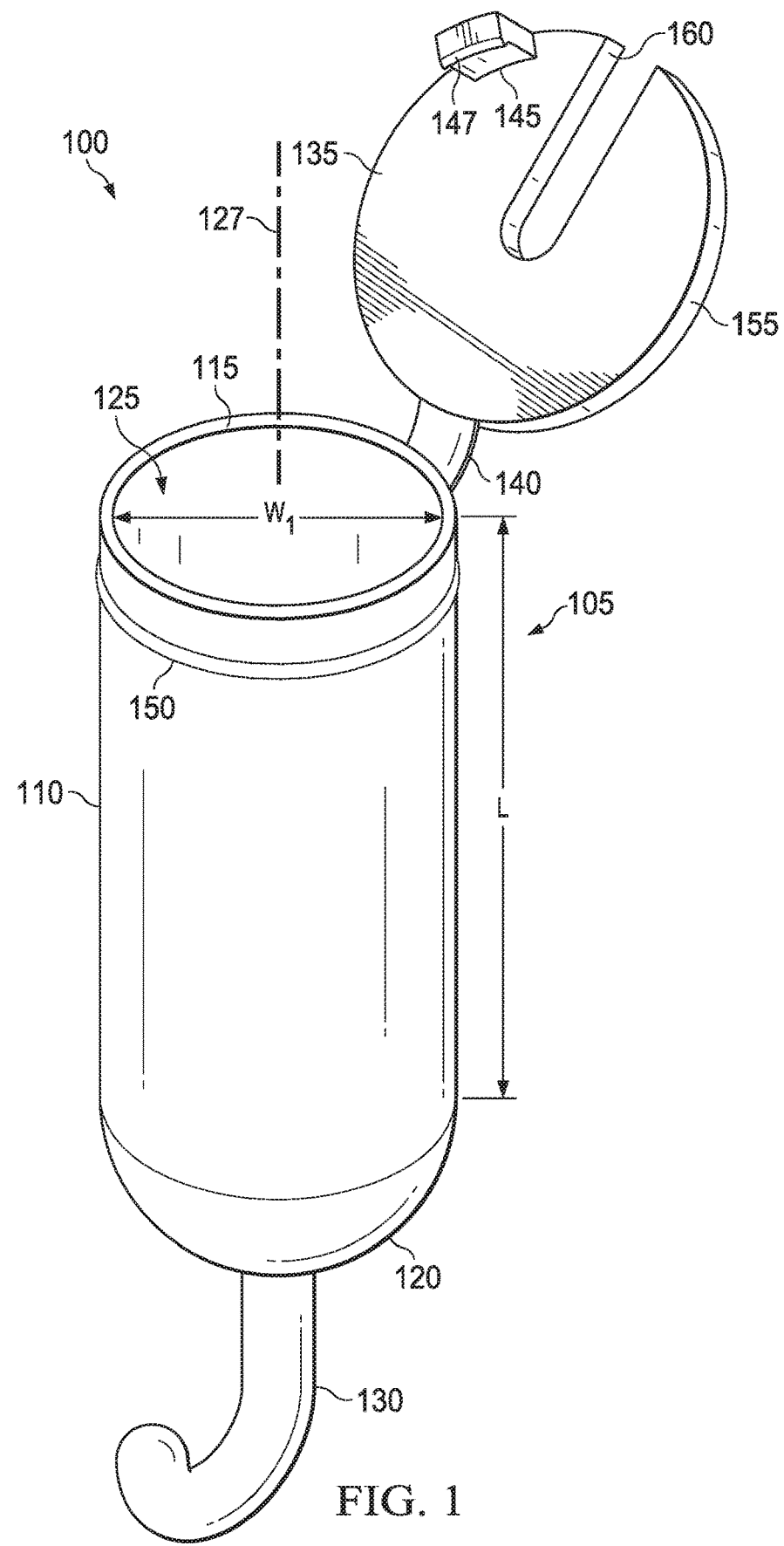
FIG. 1 is an isometric view of an example container that may be used for enclosing a fishing hook, according to some example embodiments.

FIG. 1 is an isometric view of an example of a container 100 that can be used to enclose and/or store fishing hooks, including fishing hooks on a line, and any associated lure. The container 100 comprises a body 105, which may be formed by a side wall 110, a first end 115, and a second end 120 opposite the first end 115. The first end 115 may be open to a compartment or cavity, such as a cavity 125, within the body 105. For example, the first end 115 may define an opening that is transverse to a longitudinal axis 127 of the cavity 125. The second end 120 may be closed. The side wall 110 may also have indentations or other features to facilitate an ergonomic grip.

As illustrated in the example of FIG. 1, the side wall 110 may form a right circular hollow cylinder in some embodiments. More generally, the side wall 110 may have a variety of geometric sections, including most polygonal and elliptical sections. For example, the side wall 110 may be a hollow cylinder or a hollow prism in some embodiments.

The dimensions of the side wall 110 may vary to provide an ergonomic grip. For example, the side wall 110 may be characterized by a length L between the first end 115 and the second end 120. In some embodiments, the length L may be between approximately 2 inches (approximately 50.8 millimeters) and approximately 8 inches (approximately 203.2 millimeters). For example, in some instances, the length L of the side wall 110 may be approximately 4 inches (approximately 101.6 millimeters), while in some other instances, the length L may be smaller at approximately 2.5 inches (approximately 63.5 millimeters) or larger at approximately 7 inches (approximately 177.8 millimeters). The dimensions of the cavity 125 may also be varied to accommodate varying sizes of hooks and lures. For example, the cavity 125 may be characterized by a width $W_1$, which may be between approximately 1 inch (approximately 25.4 millimeters) and approximately 2 inches (approximately 50.4 millimeters) in some embodiments. In some particular instances, the width $W_1$ of the cavity 125 may be approximately 1.5 inches (approximately 38.1 millimeters). In other examples, the cavity 125 may be characterized by more than one dimension, such as a depth, which may not be equal to the width $W_1$. The body 105 of the container 100 may be constructed such that the interior surfaces of the side wall 110, first end 115, and second end 120 forming the cavity 125 have substantially or entirely smooth surfaces, which can significantly reduce or eliminate snagging or catching a hook or lure.

As illustrated in the example of FIG. 1, the first end 115 may have an annular face or rim that defines an opening and exposes the cavity 125 within the body 105. The annular face may be orthogonal to the longitudinal axis 127 of the cavity 125 or side wall 110 of the body 105 in some examples. In some embodiments, the first end 115 may have a circular opening corresponding to a circumference of the side wall 110 of the container 100. In other embodiments, the opening of the first end 115 may be an alternative shape that corresponds to a section of the side wall 110.

The second end 120 may have a hemispherical surface in some embodiments. The hemispherical surface of the second end 120 provides an aesthetically pleasing shape to the container 100. More generally, the second end 120 may comprise a polyhedron surface, including triangular-peaked or pyramidal, flat or disc-shaped, among others. In some examples, the second end 120 may be fabricated with an integral closure; in other examples, a removable cap may close the second end 120. Additionally, or alternatively, some embodiments of the second end 120 may have a closure with one or more perforations or may be a mesh.

The container 100 may further comprise means for securing the body 105. For example, a latch 130 may be positioned or attached on or adjacent to the second end 120 of the body 105 for securing the body 105. The latch 130 may be a hook having a blunt tip, and in some embodiments, the latch 130 may be an eye hook. Other suitable latches may include a clip, carabiner, or magnet, for example. The curvature of the latch 130 may be such that the latch 130 is suitable for securing the body 105 to a ring or loop on a fishing rod. In some embodiments, the latch 130 may be rigidly coupled to the body 105. For example, the latch 130 may be formed integrally with the body 105 of the container 100, such as by molding the body 105 and latch 130 as a single structure. In alternative embodiments, the latch 130 may be formed separately from the body 105 of the container 100, and may then be rigidly affixed to the second end 120 of the body 105. In some embodiments, the latch 130 may operate as a fixed structure, while in additional or alternative embodiments, the latch 130 may include an attachment mechanism that allows it to rotate or swivel with respect to the body 105 of the container 100. In yet other examples, the means for securing the body 105 may comprise a ring, loop, keeper, or other fastener configured to receive a latch. For example, a closed loop may be coupled to the second end 120, and a carabiner may be attached to the closed loop.

The container 100 may also comprise a lid or cap for enclosing the first end 115 of the body 105. As illustrated in FIG. 1, for example, a cap 135 may be tethered to the body 105 at or near the first end 115. In some embodiments, the cap 135 may be a snap-on cap, which may snap onto the first end 115 of the body 105 of the container 100. Alternatively, the cap 135 may form a friction or interference fit with the first end 115 of the body 105. The cap 135 may comprise a variety of shapes, such as a circular disc, a dome, a pyramid, a prism, among other shapes.

In some embodiments, the cap 135 may be attached to the body 105 by a hinge 140 proximate to the first end 115. For example, the hinge 140 may be a flexible strip capable of elastic deformation. Other suitable types of hinges may include a spring hinge, a barrel hinge, a pivot hinge, or a strap hinge.

As illustrated in FIG. 1, the container 100 may also include a closing mechanism for securing the cap 135 to the body 105 over the first end 115 if the cap 135 is in a closed position. In some embodiments, the closing mechanism may comprise a hitch 145 that is configured to releasably couple with a portion or feature of the body 105, such as catch at or proximate to the first end 115. For example, the hitch 145 may be a clip and may be positioned at or near an edge 155 of the cap 135, and the catch may be in the form of a ridge 150 on the body 105 of the container 100 at or near the first end 115. For example, the hitch 145 may be formed so as to have a protrusion 147 near its tip that protrudes from the hitch 145 and extends around or below the ridge 150 on the outside of the body 105. In some additional embodiments, the hitch 145 may be a clip, and the catch may be in the form of an opening or recess in the body 105. Alternatively, the hitch 145 may be positioned on the cap 135 so as to be positioned within the first end 115 when the cap 135 is in a closed position. In such instances, the protrusion 147 of the hitch 145 may protrude through the catch towards the outside of the first end 115. In some further embodiments, the cap 135 may enclose the first end 115 of the body 105 through an interference or friction fit. For example, the cap 135 may be formed so as to include a lip around the edge 155 for fitting within a perimeter or circumference of the first end 115 of the body 105. Other additional or alternative means for securing the cap 135 to the first end 115 of the body 105 may also be used, and may include hook-and-loop fasteners, button or snap fasteners, magnetic fasteners, or any other type of securing means suitable for releasing with one hand.

The cap 135 may include an opening, such as a slot 160 having an open end, which may be configured so as to allow for the passage of a thread or string, such as a fishing line. In some embodiments, the slot 160 may extend from a center portion of the cap 135 away from the hinge 140 to the edge 155 of the cap 135. The dimensions of the slot 160 may vary depending on the particular size and shape of the body 105 and cap 135 of the container 100. For example, in some embodiments the cap 135 may be circular, and the slot 160 may have a length approximately equal to the radius of the cap 135. The width of the slot 160 may also vary, but should be of a sufficient width to allow a fishing line to slide freely through the slot 160 without causing significant friction or abrasion. For example, the slot 160 may have a width of between about ⅛ inch (about 3.175 millimeters) and about ½ inch (about 12.7 millimeters).

The container 100 and its components may be constructed or formed using a variety of different techniques. For example, the container 100 may be constructed as a single structure or be constructed from multiple pieces that are then affixed together, such as through bonding. In some embodiments, the container 100 is formed as a single structure using one or more molding techniques, such as injection molding. For example, the body 105, latch 130, cap 135, and hinge 140 of FIG. 1 may be formed as one structure. In other embodiments, one or more of the body 105, the latch 130, and the cap 135 may be constructed as separate pieces and subsequently bonded together. In some additional instances, one or more of the individual components of the container 100 may also be constructed as separate pieces and then formed together. For example, the body 105 may be initially formed as separate pieces, with a majority of the body 105 formed as a cylinder and a section of the body 105 at the second end 120 being formed separately in a hemispherical shape and subsequently affixed to the cylindrical portion of the body 105. In some examples, the body 105 may be fabricated without hinges or fasteners, which can significantly reduce fabrication complexity and cost.

The container 100 and its various components may be made or constructed from a variety of materials. In some embodiments, the container 100 may be constructed from a single, polycarbonate material. Example materials for constructing the container 100 may include, for example, injection-molding plastics, polycarbonate (PC), polypropylene (PP), low-density polypropylene (LDPE) or any other known plastics material that may be suitable. In some additional or alternative embodiments, one or more of the components of the container 100, such as the body 105, the latch 130, and/or the cap 135, may be made from a different material than other components. The container 100 may also be constructed in a variety of sizes and shapes to accommodate different sizes and shapes of fishing lures and hooks, as well as different configurations of fishing rods. In some embodiments, some or all of the container 100 may be transparent, semi-transparent, or translucent to permit viewing any contents, such as a fishing lure, in the container 100.

Figure 2:
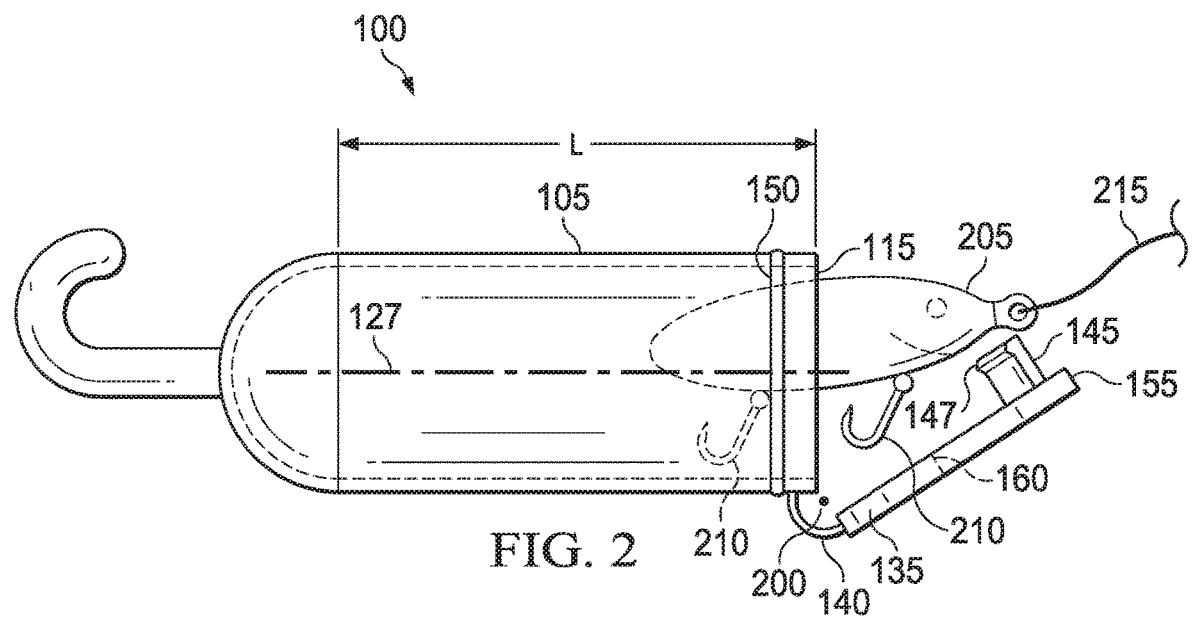
FIG. 2 is a side view of the container of FIG. 1 in an open configuration with a fishing lure.

FIG. 2 is a side view of the container 100 of FIG. 1 with the cap 135 in an open position. As illustrated in the example of FIG. 2, the cap 135 may be configured to pivot or rotate away from the first end 115. For example, the cap 135 may be configured to rotate about the hinge 140. In some examples, the hinge 140 may have an axis of rotation 200 that is orthogonal to the longitudinal axis 127 of the cavity 125. For example, the slot 160 may have an open end at the edge 155 that is opposite the hinge 140. In more particular embodiments, the hinge 140 may be coupled to the cap 135 opposite an open end of the slot 160. Additionally, or alternatively, the axis of rotation 200 may be substantially aligned with or lie substantially within the plane of the first end 115.

In some embodiments, the hitch 145 can be released from the ridge 150, and the cap 135 can be separated from the first end 115 to expose the cavity 125 within the body 105. For example, a single hand can grasp the container 100, and a thumb can release the hitch 145 from the ridge 150 in order to separate the cap 135 from the first end 115 of the body 105. The hinge 140 can retain the cap 135 in close proximity to the first end 115 of the body 105. With the cap 135 in the open position, a fishing lure 205 with one or more hooks 210 may be placed into and/or removed from the cavity 125 within the body 105. The body 105 can then be moved towards the fishing lure 205, which may be connected to a line or string, such as a fishing line 215. The fishing lure 205 may pass into the cavity 125 within the body 105 through the first end 115 of the container 100.

Figure 3:
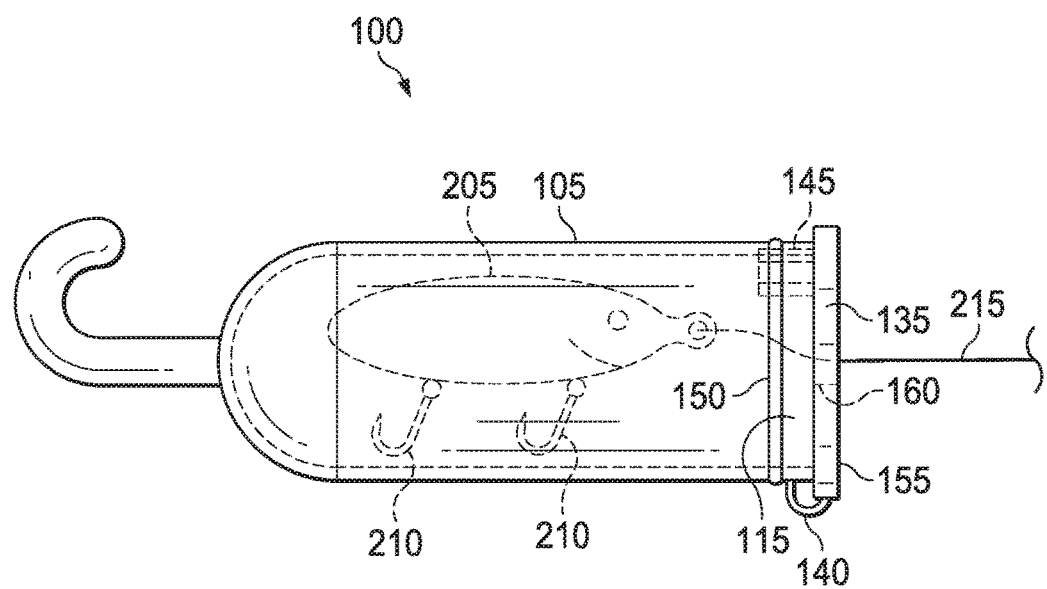
FIG. 3 is a side view of the container of FIG. 1 in a closed configuration.

FIG. 3 is a side view of the container 100 of FIG. 1 with the cap 135 in a closed position. As illustrated in the example of FIG. 3, the fishing line 215 may be placed within the slot 160 of the cap 135 before or as the cap 135 is closed. The fishing line 215 may pass through the cap 135 and remain connected to the fishing lure 205 when the cap 135 is in the closed position on the body 105. The hitch 145 may then be coupled to the ridge 150 in order to secure the cap 135 to the body 105 over the first end 115 of the container 100. In the closed position, the cap 135 may be secured to the first end 115 of the body 105 by the hitch 145 being coupled to the ridge 150. The cap 135 may also be secured by forming a friction fit with the first end 115 of the body 105. As depicted in the example of FIG. 3, the fishing lure 205 may be securely positioned and stored within the cavity 125 of the body 105. The hooks 210 may be entirely enclosed within the container 100. As a result, the hooks 210 can be isolated from the surrounding environment, eliminating or substantially reducing the hazard to people, animals and other equipment in the vicinity. As also shown in FIG. 3, the fishing line 215 may extend from the fishing lure 205 inside of the container 100 continuously through the slot 160 in the cap 135 to the outside of the container 100. When ready to remove the fishing lure 205 from the container 100, a single hand can hold the container 100 and uncouple the hitch 145 from the ridge 150 in order to lift off the cap 135 from the first end 115 of the body 105 and open the container 100. The fishing lure 205 and the hooks 210 may then be removed from the container 100.

Figure 4:
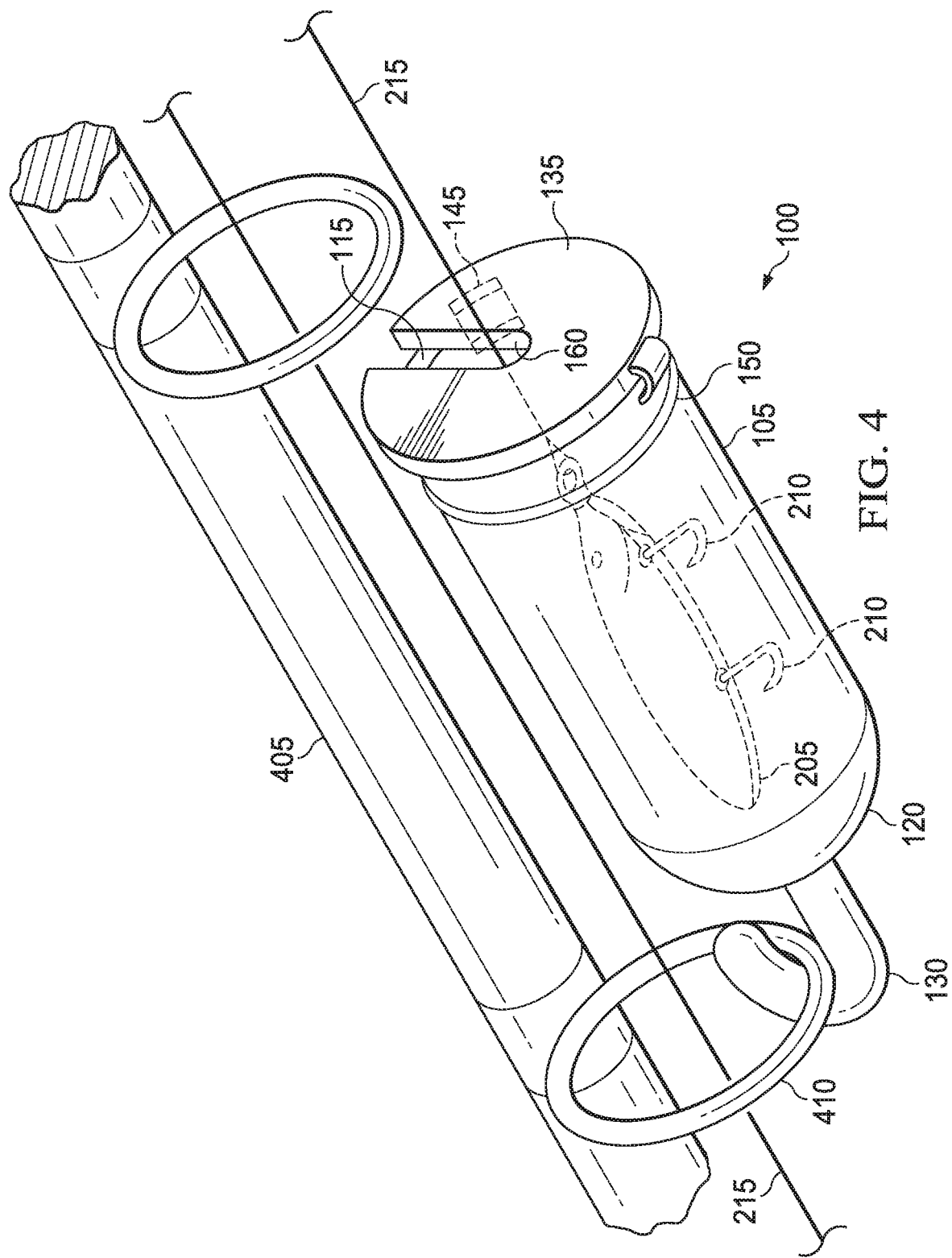
FIG. 4 is an isometric view of the container of FIG. 1 shown in conjunction with an example fishing rod.

FIG. 4 is isometric view of an example of the container 100 of FIG. 3 secured to a fishing rod 405. As shown in FIG. 4, the fishing lure 205 is positioned within the container 100, and the container 100 is in a closed configuration with the fishing line 215 extending through the slot 160 in the cap 135 of the container 100. As also illustrated, the latch 130 of the container 100 can be attached to a guide loop 410 of the fishing rod 405 in order to secure the container 100 to the fishing rod 405 so that the container 100 does not freely move about in the environment surrounding the fishing rod 405. For example, a single hand can secure the latch 130 to the guide loop 410, while the other hand is holding the fishing rod 405. In other examples, the container 100 may have a ring, loop, magnet, or similar connector that can be secured to a suitable fastener attached to the fishing rod 405, such as a latch or clip coupled to the guide loop 410 or other part of the fishing rod 405. Thus, the fishing lure 205 can be attached to the fishing line 215, which can be connected at another end to a fishing spool or reel, and the latch 130 may secure the container 100 with the fishing lure 205 to the guide loop 410 of the fishing rod 405. After the fishing lure 205 is placed in the container 100, and the cap 135 is closed, and the latch 130 is secured to the guide loop 410, any slack in the fishing line 215 may be removed and tension may be placed on the fishing line 215 to keep the latch 130 secured to the guide loop 410. This may cause the fishing lure 205 to come into contact with the lid 135, exerting a force on the lid 135 in a direction away from the second end 120. The closing mechanism, such as the hitch 145 and the ridge 150, may be configured to require an opening force greater than the force from the fishing lure 205 applied to the lid 135 when a tension to keep the container 100 secured to the fishing rod 405 is applied to the fishing line 215. Thus, the closing mechanism may be strong enough to keep the lid 135 closed when a tension is applied to the fishing line 215 to keep the container 100 secured to the fishing rod 405, but does not require an opening force that is too high to be applied by one hand. The cap 135 may be opened and/or closed while the container 100 is still secured by the latch 130 to the guide loop 410. Thus, in some embodiments, opening the cap 135 and inserting the fishing lure 205 into the container 100 does not require removal of the latch 130 from the fishing rod 405.

Figure 5:
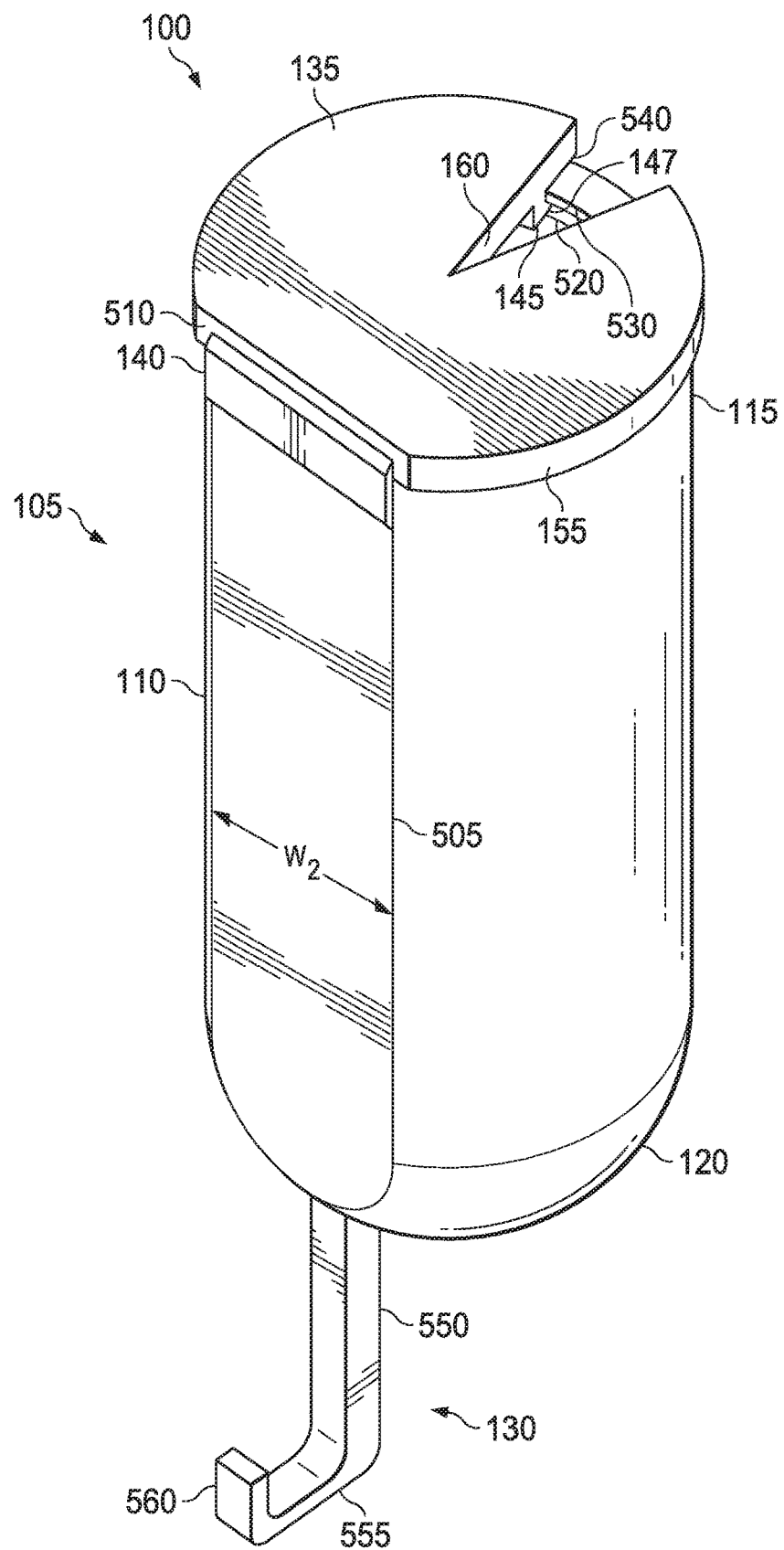
FIG. 5 is an isometric view of another example of a container that may be used to enclose a fishing hook, according to another example embodiment.

FIG. 5 is isometric view of another example of the container 100 that can be used to enclose and/or store fishing hooks and any associated lure. In the embodiment of FIG. 5, the side wall 110 may form a hollow cylinder with a flat portion 505. In some embodiments, the flat portion 505 may comprise between approximately 10% and 40% of a surface area of the side wall 110. For example, the flat portion 505 may have a length that is substantially the length of the side wall 110, and may have a width W2 between approximately ½ inch (approximately 12.7 millimeters) and approximately 1.5 inches (approximately 38.1 millimeters) in some embodiments. In some circumstances, the flat portion 505 may provide beneficial ergonomics. For example, the edges of the flat portion 505 parallel to a length L of the container 100 may allow for a more secure grip of the container 100. The flat portion 505 may also allow for the container 100 to be better positioned when secured to a portion of a fishing rod.

As shown in FIG. 5, the latch 130 may be in the form of a hook having square or rectangular segments, along with a blunt tip. In the embodiment of FIG. 5, the latch 130 may also be positioned on the second end 120 so as to be adjacent to the flat portion 505 of the side wall 110. Thus, in some embodiments, the latch 130 may be positioned substantially away from the center of the second end 120 so as to extend away from the body 105 of the container 100 directly below the flat portion 505. In some instances, the latch 130 may have a bend oriented perpendicular to the flat portion 505, and may have a shank positioned at a flat or straight-line edge of the container 100 formed by the flat portion 505 of the side wall 110. As also depicted in FIG. 5, the latch 130 may comprise a plurality of sections, for example a first section 550, a second section 555, and a third section 560. As shown in FIG. 5, the latch 130 may be oriented such that third section 560 extends towards the second end 120. The length of the first section 550 may determine how far the latch 130 extends away from the second end 120 of the container 100 before curving or hooking. For example, the first section 550 may have a length of between approximately 1 inch (approximately 25.4 millimeters) and approximately 2 inches (approximately 50.8 millimeters). In some embodiments, the length of the first section 550 may have a length of approximately 1.25 inches (approximately 31.8 millimeters). In some embodiments, the length of the first section 550 may have a length of approximately 2 inches (approximately 50.8 millimeters). Each of the sections of the latch 130 may be positioned with respect to each other at substantially 90-degree angles to define an opening of the latch 130. The squared or 90-degree angle configuration of the latch 130 may be suitable for securing the body 105 of the container 100 to a ring or loop on a fishing rod, and may also be particularly effective for hooking on to other gear or clothing, such as an opening of a pants pocket. The square shape of the latch 130, in combination with the flat portion 505 of the side wall 110, may also allow the container 100 to sit flush if hooked or secured to an article of clothing, such as the front pocket of a pair of trousers. Similar to the example of FIG. 1, the latch 130 of FIG. 5 may be formed integrally with the body 105 of the container 100 in some embodiments.

In some embodiments, the edge 155 may include a straight portion 510. The straight portion 510 may be sized and configured so as to substantially align with the flat portion 505 of the side wall 110 of the container 100. As illustrated in FIG. 5, the cap 135 may be attached to the body 105 by the hinge 140 proximate to the first end 115. As shown in FIG. 5, the hinge 140 may span a substantial majority of the straight portion 510 of the edge 155 of the cap 135 and the width of the flat portion 505.

The container 100 of FIG. 5 may also include a closing mechanism for securing the cap 135 to the body 105 over the first end 115. In some embodiments, the closing mechanism may comprise a means for fastening the cap 135 to a feature of the first end 115. For example, the cap 135 may be configured to snap on the body 105, having an underside or inside surface comprising one or more hitches 145 that include a protrusion 147 extending therefrom which may fit into a groove 520 on a portion of the inside surface of the side wall 110 at the first end 115. In some embodiments, the closing mechanism may be formed by the protrusion 147 and the groove 520. A lip 530 may be formed above the groove 520. The hitch 145 may be flexible. For example, the hitch 145 may flex as it moves over the lip 530 into or out of the groove 520. Thus, when the cap 135 is moved to a closed position, the protrusion 147 may fit snugly in the groove 520 and securely under the lip 530. To move the cap 135 into the closed position, a modest force may be applied to move the protrusion 147 past the lip 530 and into the groove 520. As also depicted in FIG. 5, the cap 135 may comprise a portion that extends beyond the lip 530 of the first end 115, such as an overhang 540. The overhang 540 may provide a surface to which an upwards or opening force may be applied so as to readily move the protrusion 147 past the lip 530 to move the cap 135 to an open position. The overhang 540 may aid in opening the cap 135 by one hand. For example, a user may grasp the side wall 110 with their hand and can position their thumb of the same hand under the overhang 540. The user may then move their thumb upward against the overhang 540 to open the cap 135. In some embodiments, the overhang 540 may be replaced with one or more tabs that extend from the cap 135.

While the shape and dimensions of the slot 160 may vary depending on the particular embodiment, the slot 160 of FIG. 5 is a wedge, such that the width of the slot 160 increases with distance away from a center portion of the cap 135 towards the edge 155 of the cap 135. Thus, the slot 160 may have a wider opening at the edge 155 for facilitating the capture of a fishing line, but a relatively narrow opening that terminates in a point or vertex at the center portion of the cap 135 so as to prevent a fishing hook and/or lure contained within the container 100 from protruding out of the slot 160 and being exposed. In some examples, the width of the slot 160 at the edge 155 may be about ⅛ inch (about 3.2 millimeters) to about ½ inch (about 12.7 millimeters). In some examples, the width of the slot 160 at the edge 155 may be about ⅜ inch (about 9.5 millimeters).

Figure 6:
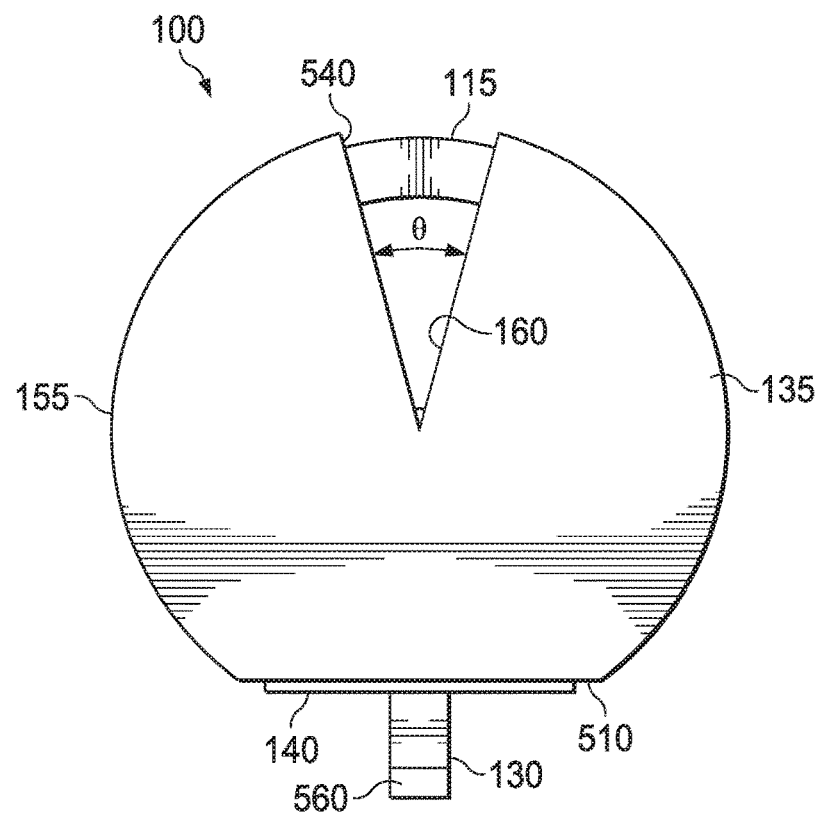
FIG. 6 is a top view of the container of FIG. 5, showing additional details according to some embodiments.

FIG. 6 provides a top-view of the container 100 of FIG. 5, showing some additional details particularly with respect to the cap 135, hinge 140, latch 130, and slot 160. As shown in FIG. 6, the width of the hinge 140 may be comparable to the width of the straight portion 510 of the edge 155 of the cap 135. As can also be seen in FIG. 6, the end-portion or tip of the latch 130 may extend outwards away from or beyond a plane coincident with the straight portion 510 of the cap 135 and the flat portion 505 of the side wall 110 of the body 105 of the container 100. FIG. 6 also provides an additional view showing how the overhang 540 of the cap 135 may extend over the top portion of the first end 115 of the body 105. Additionally, the wedge-shaped slot 160 may have an angle θ. In some embodiments, the angle θ may range from about 5 degrees to about 30 degrees. In some embodiments, the angle θ may be about 10 degrees. In some embodiments, the angle θ may be about 15 degrees. In some embodiments, the angle θ may be about 20 degrees.

Figure 7:
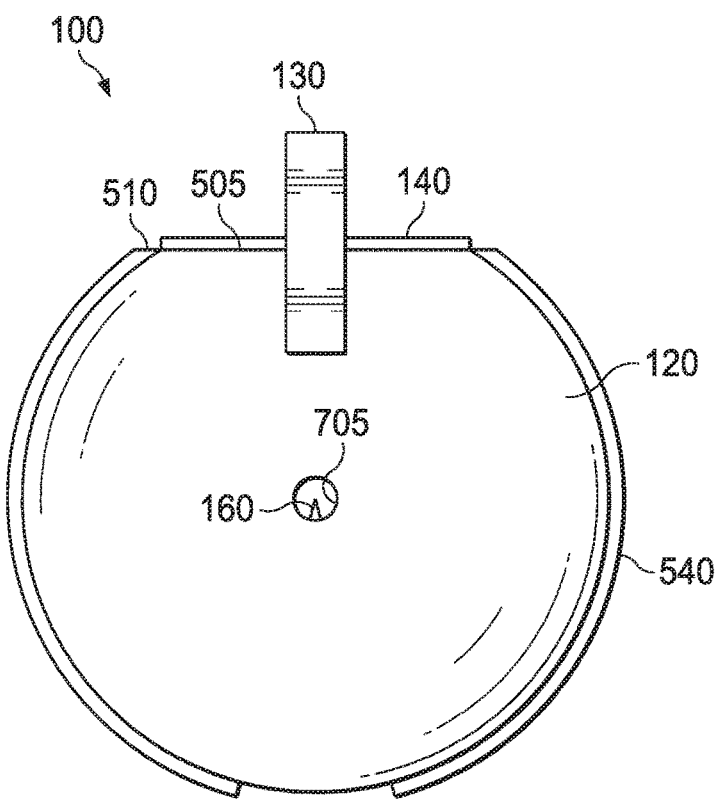
FIG. 7 is a bottom view of the container of FIG. 5, showing additional details according to some embodiments.

FIG. 7 is a bottom view of the container 100 of FIG. 5, showing some additional details specific to the second end 120 of the container 100. As can be seen in FIG. 7, the second end 120 may include a hole 705 positioned at the center portion of the second end 120. The hole 705 may allow fluid on a fishing lure and/or hook positioned within the container 100, such as water or cleaning substance, to escape and be removed from the container 100. While the hole 705 is shown as positioned in the center of the second end 120, in additional embodiments, the hole 705 may be positioned off-center. For example, the hole 705 may be positioned on the second end 120 at a position further away from or opposite the latch 130. In some embodiments, the hole 705 may have a diameter in a range of about ⅛ inch (about 3.2 millimeters) to about ½ inch (about 12.7 millimeters). In some embodiments, the second end 120 of the container 100 may include multiple holes 705. In the embodiment of FIG. 7, the center or vertex of the slot 160 may also be seen when looking upwards through the hole 705. FIG. 7 also provides another view, specifically of the underside, of the overhang 540 of the cap 135. As also illustrated in FIG. 7, the straight portion 510 may form a portion of the overhang 540. FIG. 7 also provides a view of the latch 130 extending from the second end 120, away from the hole 705, and beyond the flat portion 505 and the hinge 140 of the container 100.

Figure 8:
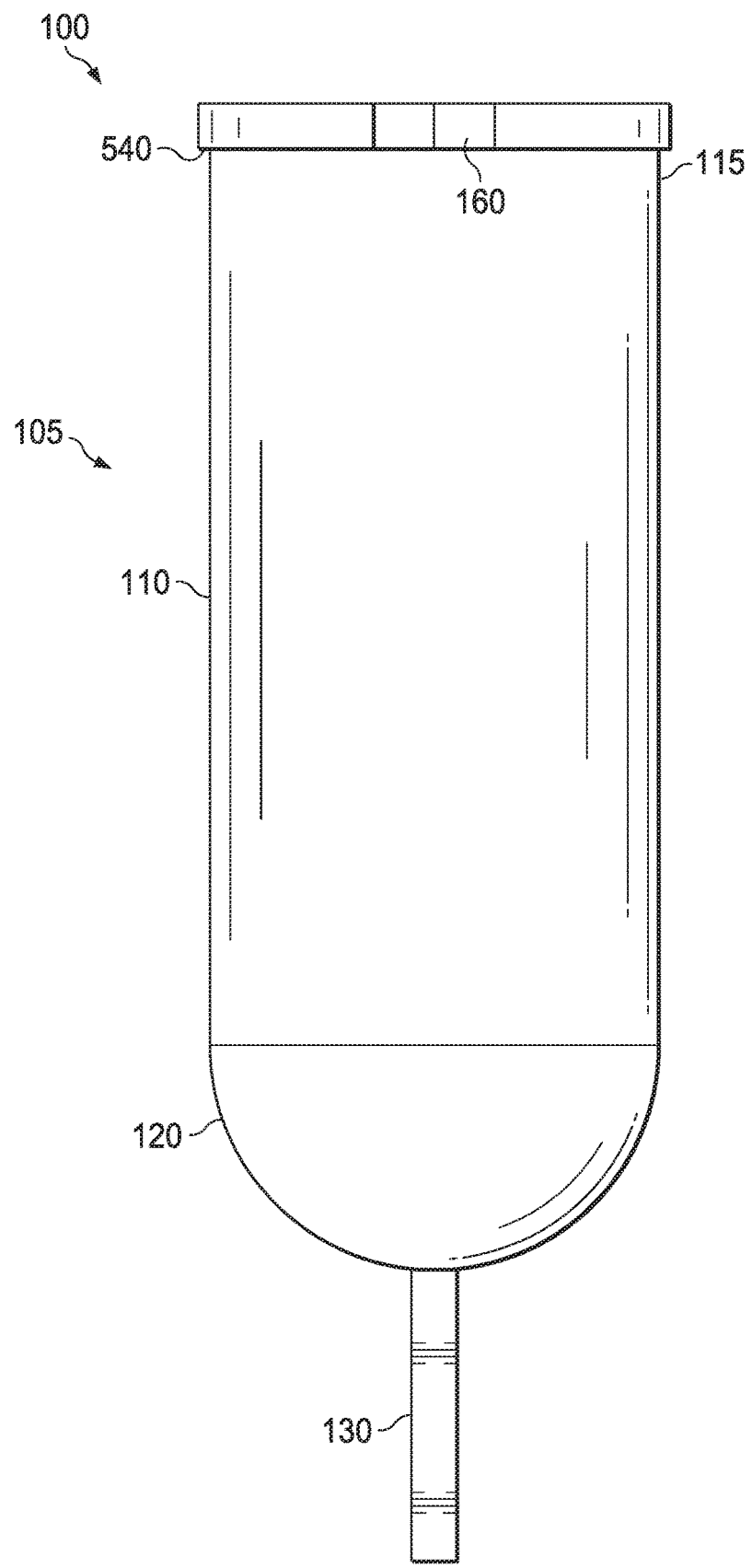
FIG. 8 is a side view of the container of FIG. 5, illustrating some additional features according to some embodiments.

Referring now to FIG. 8, a side view of the container 100 of FIG. 5 is shown. FIG. 8 shows a portion of the side wall 110 that is opposite to the flat portion 505. FIG. 8 shows how the opening of the slot 160 faces the curved portion of the side wall 110, and therefore the slot 160 opens oppositely to or away from the hinge 140 and the straight portion 510 of the edge 155.

Figure 9:
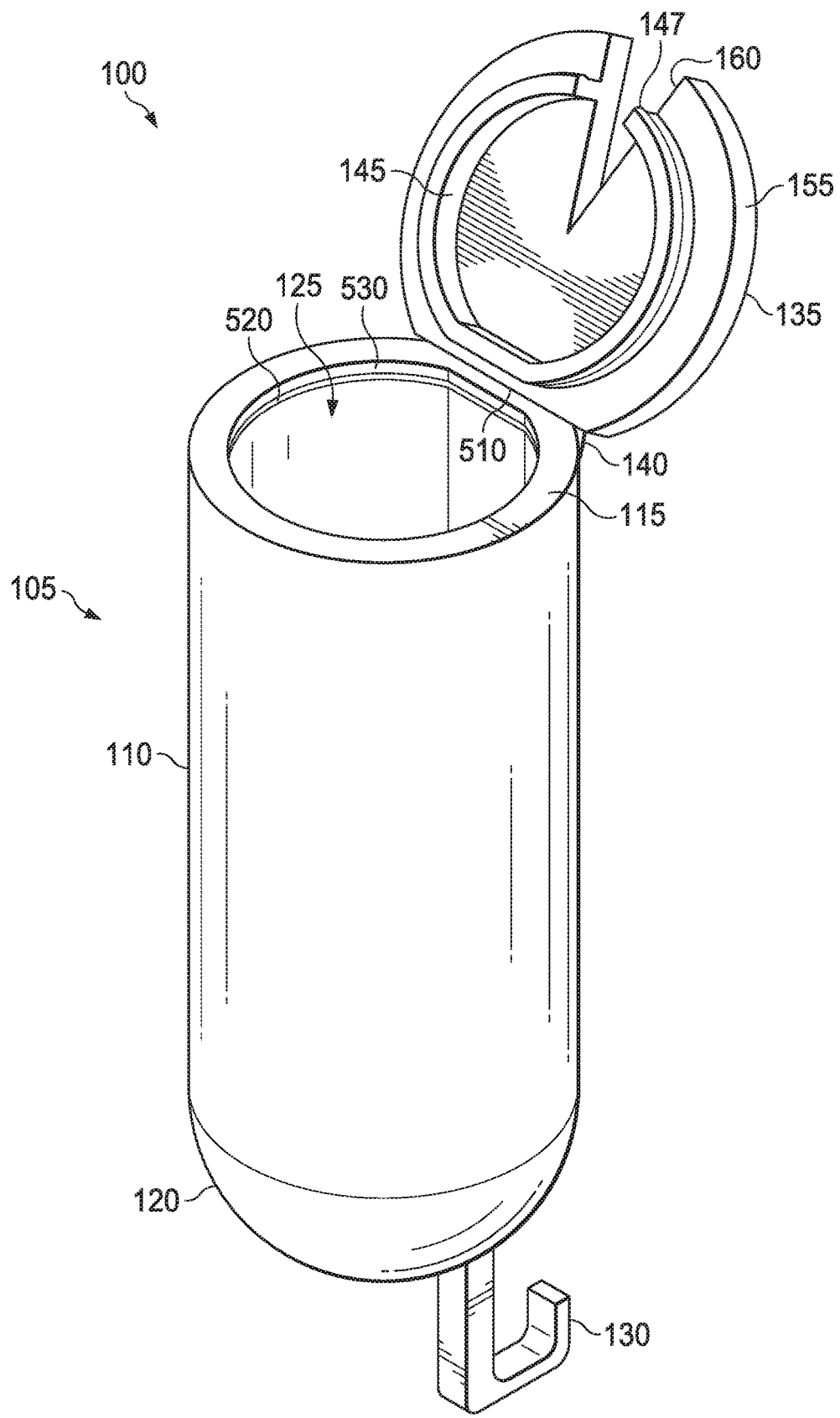
FIG. 9 is another isometric view of the container of FIG. 5.

FIG. 9 is another isometric view of the container 100 of FIG. 5, showing the cap 135 in an open configuration. In some embodiments, the hitch 145 on the inside surface of the cap 135 may be an annular hitch that is generally concentric with the edge 155. In additional or alternative embodiments, the hitch 145 may only extend around a portion of the interior surface of the cap 135. In such instances, the groove 520 on the interior surface of the side wall 110 at the first end 115 may only exist in positions that would correspond to the protrusion 147 when the cap 135 is in the closed position, although it is possible that the groove 520 may still extend around the interior circumference of the side wall 110. As illustrated in FIG. 9, the hinge 140 may be configured to support the cap 135 in an open and upright position when the container 100 is in an open configuration. For example, the hinge 140 may have a strength and/or stiffness such that the cap 135 may be supported in a position that forms an angle between approximately 45 degrees and approximately 120 degrees with the first end 115 of the container 100. Providing support for the cap 135 at such an open position, as opposed to the cap 135 hanging loosely downward against the side wall 110 of the container 100, may allow a fishing lure and/or hook to pass into the cavity 125 of the container 100, while also allowing a user to capture a fishing line in the slot 160, while operating the container 100 with a single hand.

Figure 10:
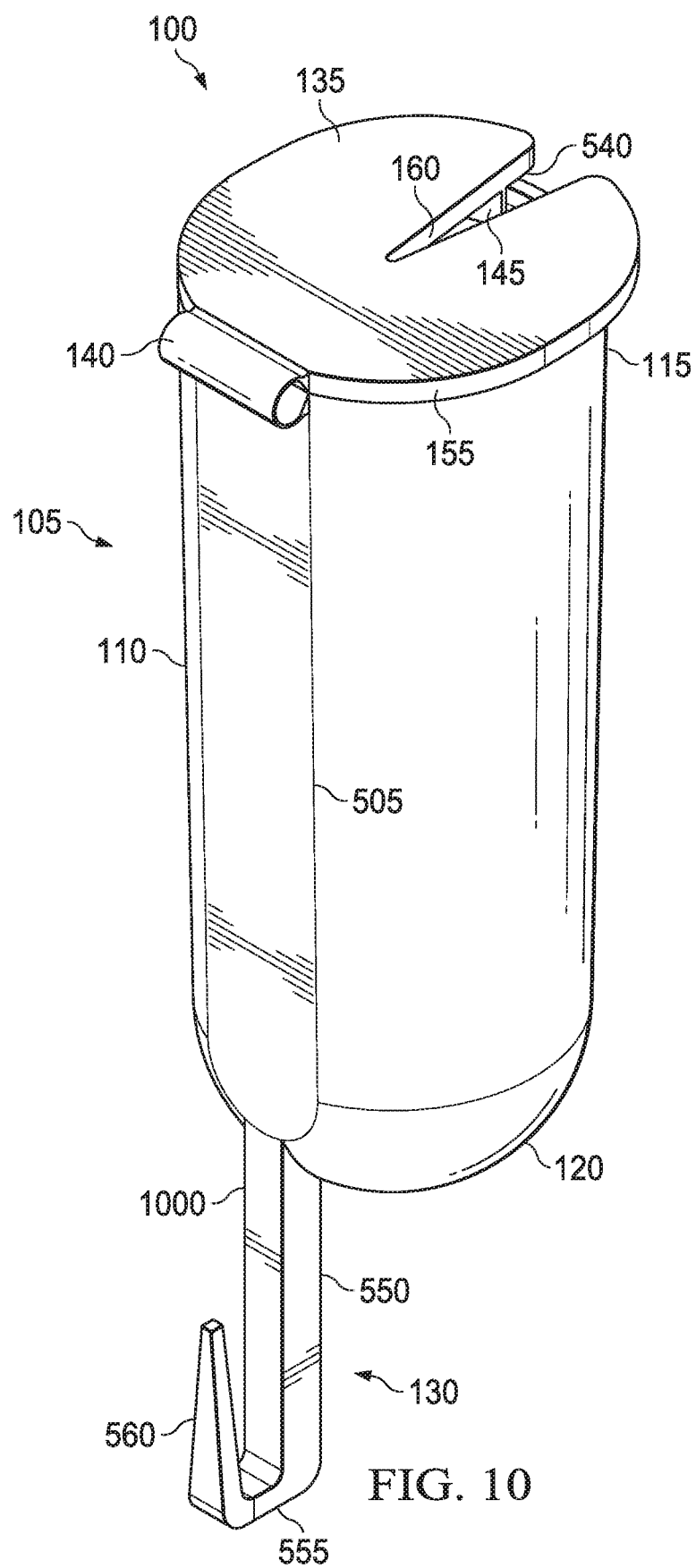
FIG. 10 is an isometric view of another example of a container that may be used to enclose a fishing hook, according to another example embodiment.

FIG. 10 is isometric view of another example of the container 100 that can be used to enclose and/or store fishing hooks and any associated lure. In the embodiment of FIG. 10, the first section 550 of the latch 130 may include a surface 1000 that faces the third section 560 of the latch 130. The surface 1000 may be flush with the flat portion 505 of the body 105. The surface 1000 may be flat. In some embodiments, the third section 560 may have a tapered shape. For example, the third section 560 may taper inward from proximate to the second section 555 toward the first end 115 of the body 105. In some embodiments, the third section 560 may have a taper angle ranging from about 5 degrees to about 15 degrees. In some embodiments, the third section 560 may have a taper angle of about 9.53 degrees. In some examples, the length of the third section 560 may range from about ½ inch (about 12.7 millimeters) to about 1.5 inches (about 38.1 millimeters). In some examples, the length of the third section 560 may be about 1 inch (about 25 millimeters). In some examples, the length of the third section 560 may be about 1.125 inches (about 28.6 millimeters). The tapered shape of the third section 560 may aid in securing the body 105 of the container 100 to a ring or loop on a fishing rod, and may also be particularly effective for hooking on to other gear or clothing, such as an opening of a pants pocket.

Figure 11:
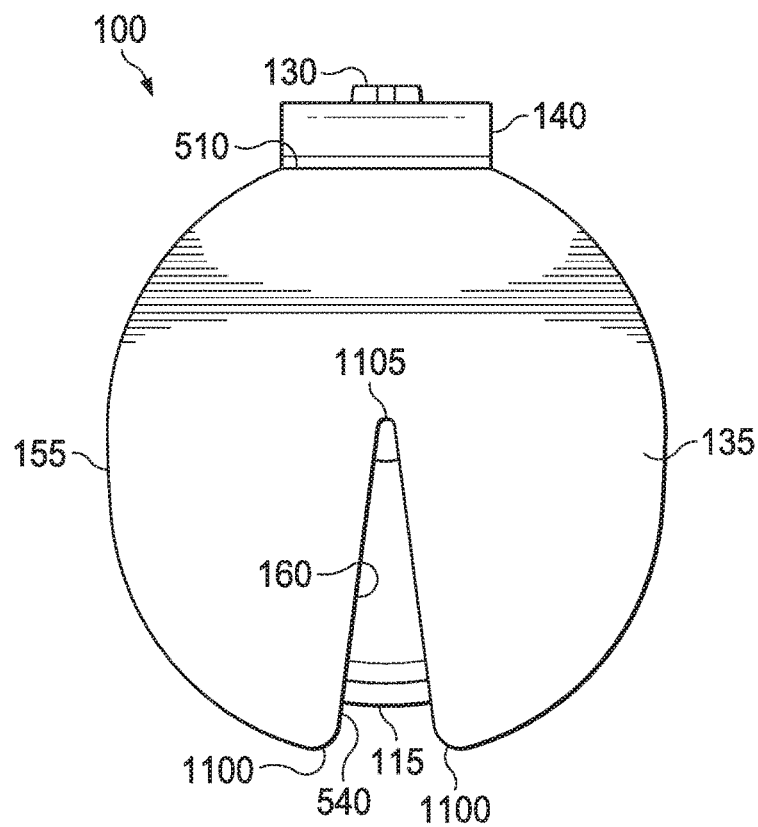
FIG. 11 is a top view of the container of FIG. 10, showing additional details according to some embodiments.

FIG. 11 provides a top-view of the container 100 of FIG. 10, showing some additional details particularly with respect to the cap 135. The cap 135 may include rounded surfaces 1100 between the edge 155 of the cap 135 and the slot 160. The slot 160 may also include a rounded vertex 1105. The rounded surfaces 1100 and the rounded vertex 1105 may aid in capturing the fishing line in the slot 160. The rounded surfaces 1100 may also reduce or prevent the cap 135 from snagging on objects. Moreover, the rounded surfaces 1100 are aesthetically pleasing.

Figure 12:
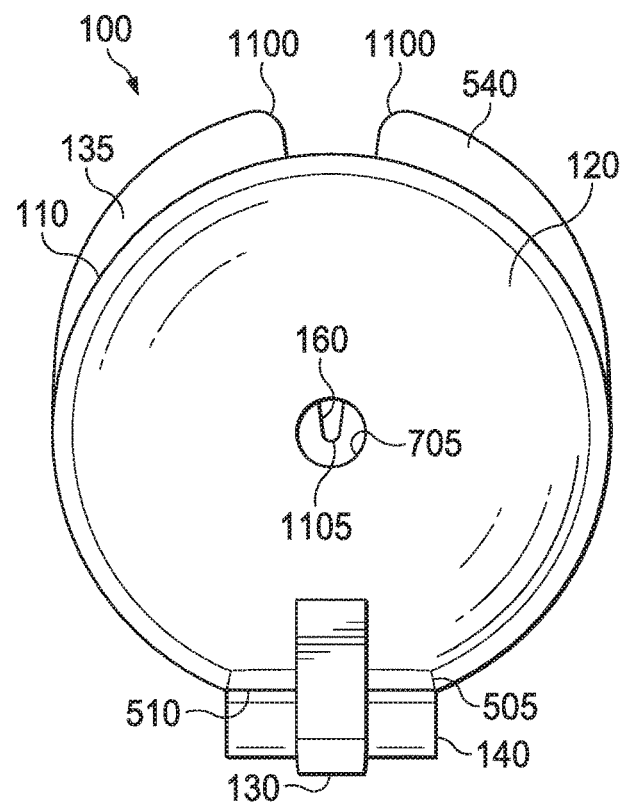
FIG. 12 is a bottom view of the container of FIG. 10, showing additional details according to some embodiments.

FIG. 12 is a bottom view of the container 100 of FIG. 10, showing some additional details with respect to the cap 135. As shown in FIG. 12, in some embodiments, the edge 155 of the cap 135 may be flush with the side wall 110 except for the overhang 540 of the cap 135, which may extend away from the flat portion 505. For example, the edge 155 on the half of the cap 135 proximate to the flat portion 505 may be flush with the side wall 110. For example, the overhang 540 may be located on the cap 135 opposite the hinge 140. In some examples, the length of the overhang 540 may range from about 0.08 inches (about 2.0 millimeters) to about 0.4 inches (about 10.2 millimeters). In some examples, the length of the overhang may be about 0.3125 inches (about 7.9 millimeters). In some examples, the length of the overhang may be about 0.2 inches (about 5.1 millimeters).

Figure 13:
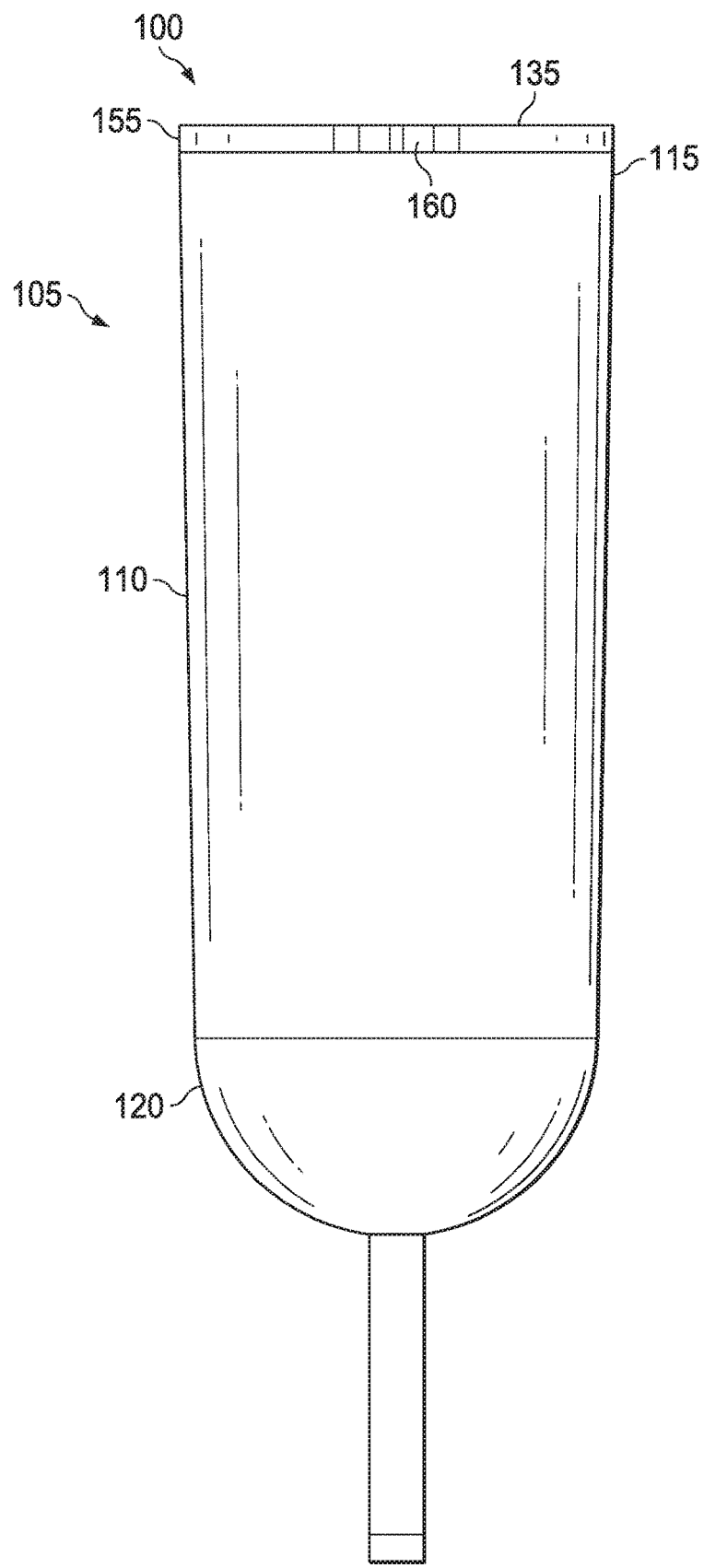
FIG. 13 is a side view of the container of FIG. 10, illustrating some additional features according to some embodiments.

Referring now to FIG. 13, a side view of the container 100 of FIG. 10 is shown. FIG. 13 shows a portion of the side wall 110 that is opposite to the flat portion 505. As shown in FIG. 8, at least a portion of the edge 155 of the cap 135 may be flush with the side wall 110 of the body 105. The portions of the edge 155 of the cap 135 that may be flush with the side wall 110 provide aesthetically pleasing shapes and features to the container 100.

Figure 14:
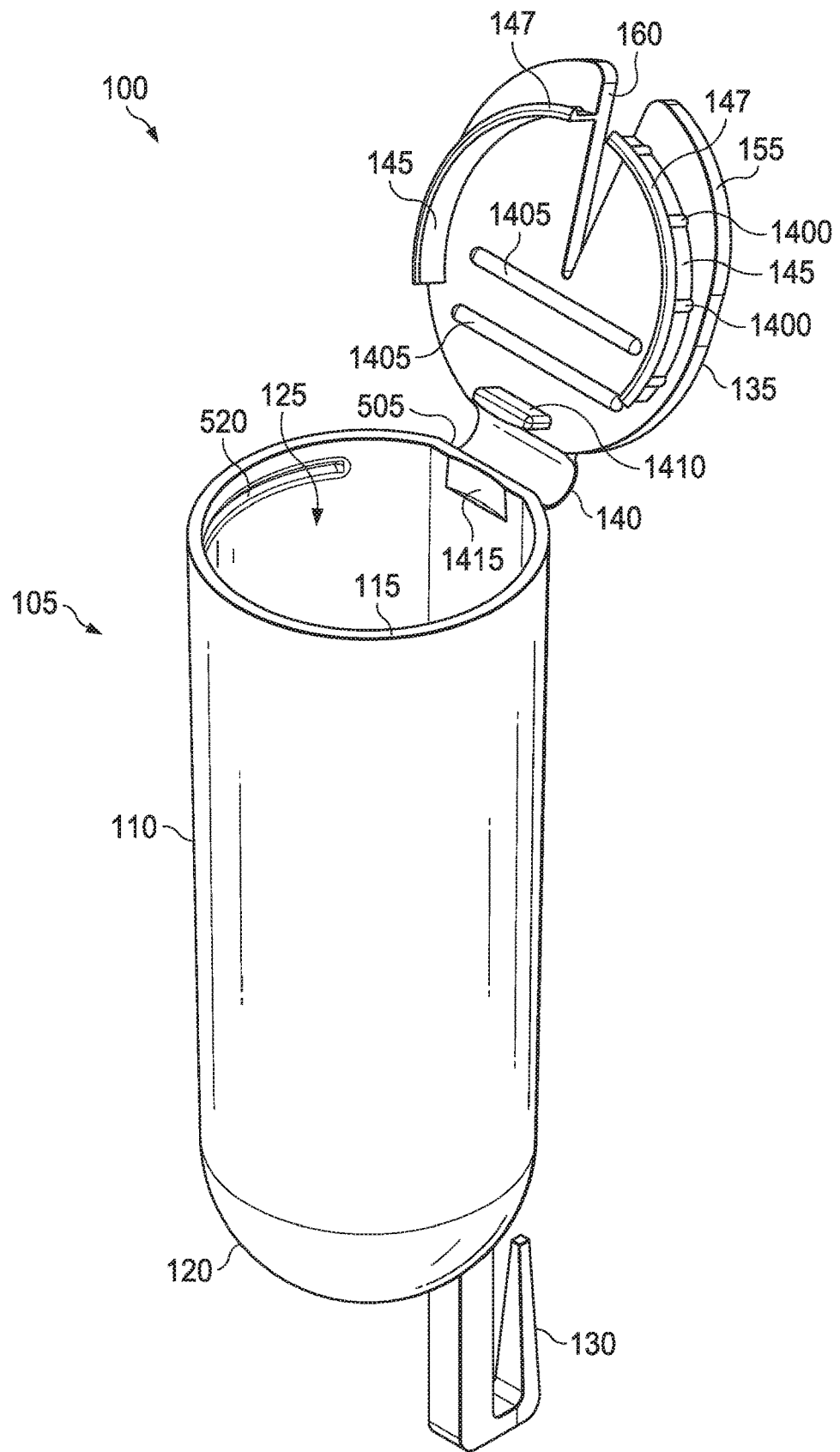
FIG. 14 is another isometric view of the container of FIG. 10.

FIG. 14 is another isometric view of the container 100 of FIG. 10, showing the cap 135 in an open configuration. In the example of FIG. 14, the cap 135 includes two hitches 145 extending around a portion of the inside surface of the cap 135. In some embodiments, each hitch 145 may include the protrusion 147 at or near the tip of the hitch 145 that protrudes outward. The protrusions 147 may be configured to fit into the groove 520 in the side wall 110. As also shown in FIG. 14, in some embodiments, the groove 520 may extend around only a portion of the side wall 110. In some embodiments, each hitch 145 may include one or more ribs 1400 extending along the hitch 145 from proximate to the interior surface of the cap 135 to the protrusion 147. The ribs 1400 may strengthen and/or increase the rigidity of the hitches 145. The ribs 1400 may increase the bending stiffness of the hitches 145. The ribs 1400 may aid in maintaining the protrusions 147 in the groove 520 when the cap 135 is closed and may help prevent unintentional opening of the cap 135. The ribs 1400 may also increase the rigidity of the cap 135 as a whole. In some embodiments, the cap 135 may further include one or more ribs 1405. The ribs 1405 may extend from the inside surface of the cap 135. The ribs 1405 may extend across a width of the cap 135. The ribs 1405 may strengthen and/or increase the rigidity of the cap 135.

In some embodiments, the cap 135 may also include a tab 1410 extending from the inside surface of the cap 135 proximate to the hinge 140. The tab 1410 may at least partially fit into a recess 1415 on the inside surface of the side wall 110 at the first end 115. Upon closing the cap 135, the tab 1410 will be received in the recess 1415. The cooperation of the tab 1410 and the recess 1415 may serve to prevent the cap 135 from moving toward the flat portion 505 of the body 105. This may ensure that the protrusions 147 on the one or more hitches 145 are securely received in the groove 520. In some embodiments, the tab 1410 may cooperate with the recess 1415 to push the cap 135 away from the flat portion 505. This may push the protrusions 147 into the groove 520, and may ensure that the protrusions 147 are securely received in the groove 520. The tab 1410 may function as a stop. The tab 1410 and the recess 1415 may aid in keeping the cap 135 closed.

Figure 15:
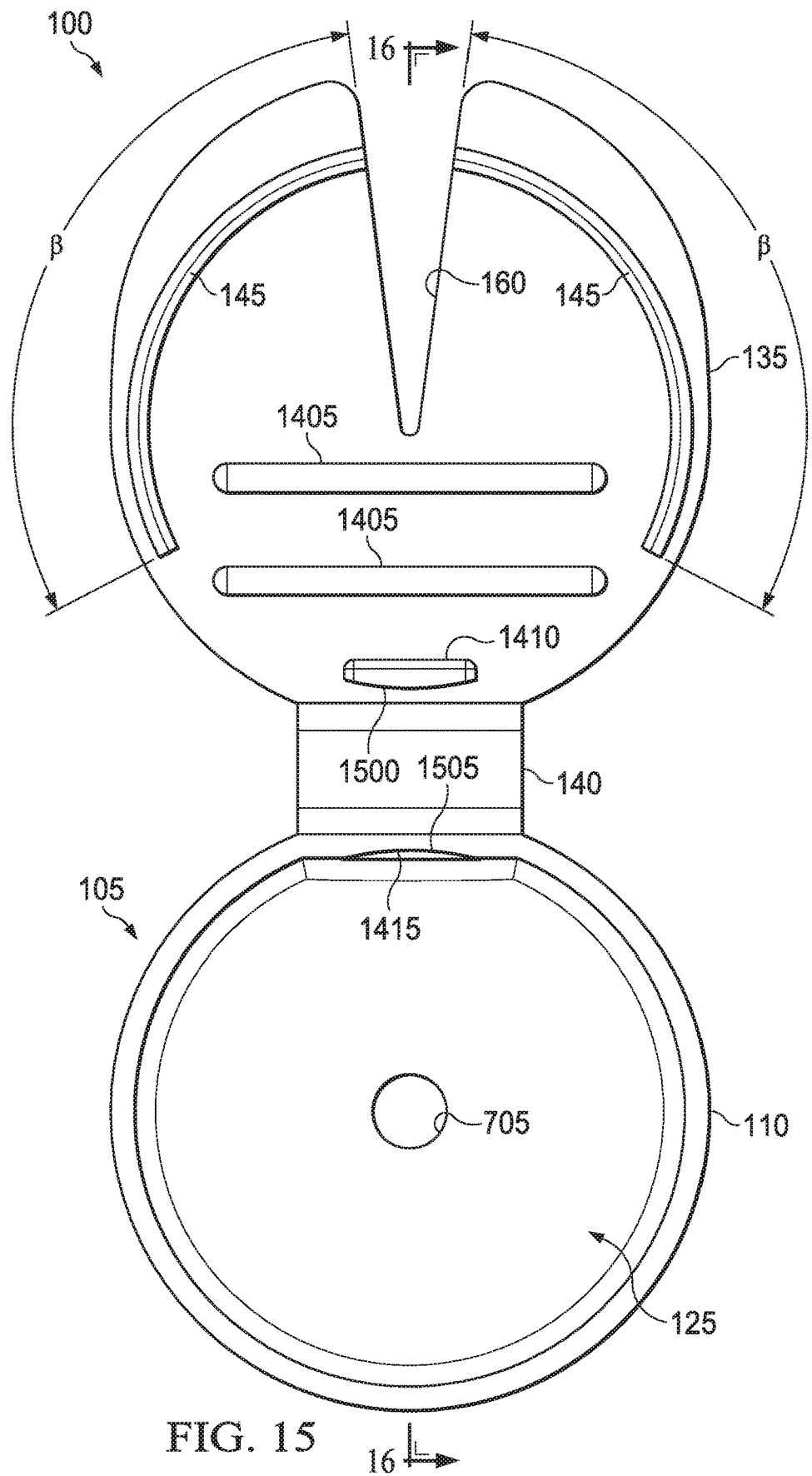
FIG. 15 is a top view of the container of FIG. 10 in an open configuration, showing additional details according to some embodiments.

FIG. 15 provides a top-view of the container 100 of FIG. 10, showing some additional details particularly with respect to the tab 1410, the recess 1415, and the hitches 145. In some embodiments, the tab 1410 may have a curved surface 1500. The curved surface 1500 may be on the side of the tab 1410 opposite the slot 160. The recess 1415 may have a curved surface 1505 that corresponds to the curved surface 1500 of the tab 1410. In some embodiments, the radius of the curved surface 1500 and the radius of the curved surface 1505 may range from about ¾ inch (about 19.1 millimeters) to about 1 inch (about 25.4 millimeters). In some embodiments the radius of the curved surface 1500 and the radius of the curved surface 1505 may be about ⅞ inch (about 22.2 millimeters). As further shown in FIG. 15, in some embodiments, each hitch 145 may extend an angle β from the slot 160 toward the tab 1410. In some embodiments, the angle β may range from about 45 degrees to about 140 degrees. In some embodiments, the angle β may range from about 100 degrees to about 120 degrees. In some embodiments, the angle β may be about 110 degrees. In some embodiments, the angle β may be about 115 degrees.

Figure 16:
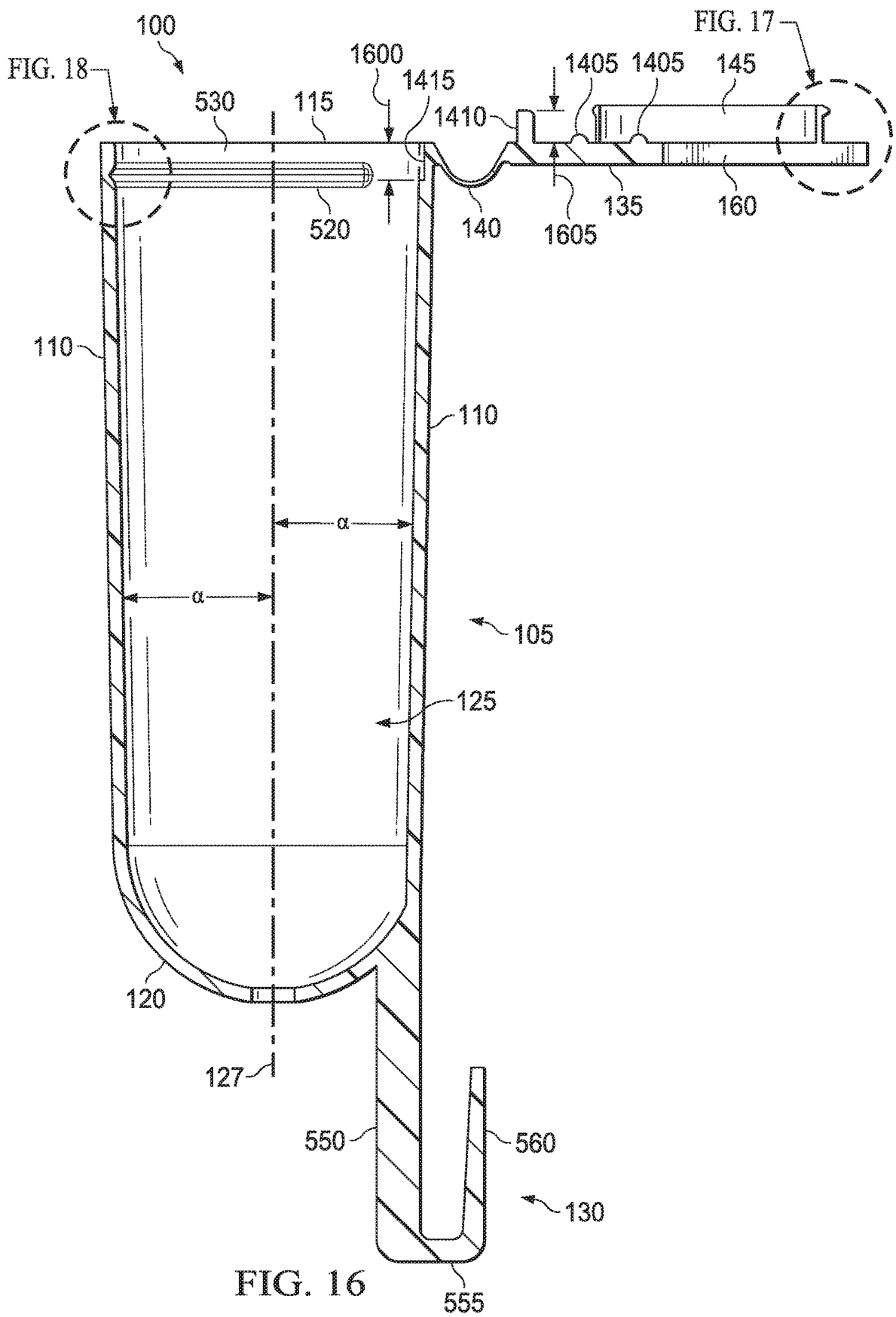
FIG. 16 is a cross-section view of the container of FIG. 15 taken along line 16-16.

FIG. 16 is a cross-sectional view of the container 100 of FIG. 15 taken along line 16-16. As shown in FIG. 16, in some embodiments, the side wall 110 of the body 105 may be angled with respect to the longitudinal axis 127. For example, the side wall 110 may have an angle α with respect to the longitudinal axis 127. In some embodiments, the angle α may range from about 1 degree to about 10 degrees. In some embodiments, the angle α may be about 1 degree. The angle α provides an aesthetically pleasing taper to the side wall 110 of the container 100. The side wall 110 may have a diameter that varies between the first end 115 and the second end 120. For example, the side wall 110 diameter may increase from proximate to the second end 120 to the first end 115. The side wall 110 may have a larger diameter at the first end 115 than proximate to the second end 120.

As further shown in FIG. 16, the recess 1415 may extend from the first end 115 toward the second end 120 a depth 1600. In some embodiments, the depth 1600 may range from about 0.125 inches (about 3.2 millimeters) to about 0.375 inches (about 9.5 millimeters). In some embodiments, the depth 1600 may be about 0.25 inches (about 6.4 millimeters). Additionally, the tab 1410 may extend from the cap 135 a length 1605. In some embodiments, the length 1605 may range from about 0.125 inches (about 3.2 millimeters) to about 0.375 inches (about 9.5 millimeters). In some embodiments, the length 1605 may be about 0.1875 inches (about 4.8 millimeters). In some embodiments, the length 1605 of the tab 1410 may be equal to the depth 1600 of the recess 1415. In some embodiments, the length 1605 of the tab 1410 may be less than the depth 1600 of the recess 1415.

Figure 17:
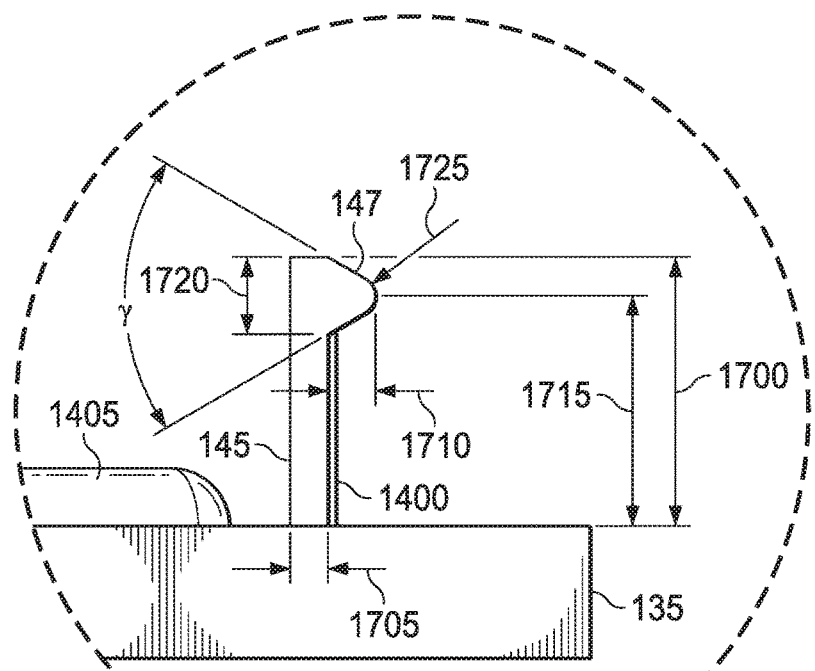
FIG. 17 is a detail view of the container of FIG. 16.

FIG. 17 is a detail view of a portion of the cap 135 of the container 100 of FIG. 16, showing some additional details specific to the hitch 145. In some embodiments, the hitch 145 may extend a length 1700 from the cap 135. In some embodiments, the length 1700 may range from about 0.125 inches (about 3.2 millimeters) to about 0.375 inches (about 9.5 millimeters). In some embodiments, the length 1700 may be about 0.25 inches (about 6.4 millimeters). The hitch 145 may have a thickness 1705 in a range from about 0.04 inches (about 1.0 millimeter) to about 0.125 inches (about 3.2 millimeters). In some embodiments, the hitch 145 may have a thickness 1705 of about 0.0625 inches (about 1.6 millimeters). In some embodiments, the thickness 1705 of the hitch 145 may be about one fourth (¼th) the length 1700 of the hitch 145.

As further shown in FIG. 17, the protrusion 147 may have a triangular profile or cross-section. The protrusion 147 may include two surfaces angled with respect one another at an angle $\gamma$. In some embodiments, the angle $\gamma$ may range from about 45 degrees to about 90 degrees. In some embodiments, the angle $\gamma$ may be about 60 degrees. The protrusion 147 may extend from a base portion at the hitch 145 to a vertex away from the hitch 145. The protrusion 147 may protrude a length 1710 may range from about 0.0156 inches (about 0.4 millimeters) to about 0.0625 inches (about 1.6 millimeters). In some embodiments, the protrusion 147 may have a length 1710 of about 0.03125 inches (about 0.8 millimeters). In some embodiments, the length 1710 of the protrusion 147 may be about half the thickness 1705 of the hitch 145. In some embodiments, the length 1710 of the protrusion 147 may be equal to the thickness 1705 of the hitch 145. The vertex of the protrusion 147 may be located a distance 1715 from the cap 135. The distance 1715 may range from about 0.09375 inches (about 2.4 millimeters) to about 0.28125 inches (about 7.1 millimeters). In some embodiments, the distance 1715 may be about 0.1875 inches (about 4.8 millimeters). In some embodiments, the distance 1715 may be about three fourths (¾th) the length 1700 of the hitch 145. The base portion of the protrusion 147 may have a width 1720. In some embodiments, the width 1720 may range from range from about 0.04 inches (about 1 millimeter) to about 0.125 inches (about 3.2 millimeters). In some embodiments, the base portion of the protrusion 147 may have a width 1720 of about 0.0625 inches (about 1.6 millimeters). In some embodiments, the width 1720 of the base portion may be equal to the width 1705 of the hitch 145. Additionally, in some embodiments, the protrusion 147 may have a rounded vertex having a radius 1725 in a range of about 0.0156 inches (about 0.4 millimeters) to about 0.03125 inches (about 0.8 millimeters). In some embodiments the radius 1725 may be about 0.0156 inches (about 0.4 millimeters).

Figure 18:
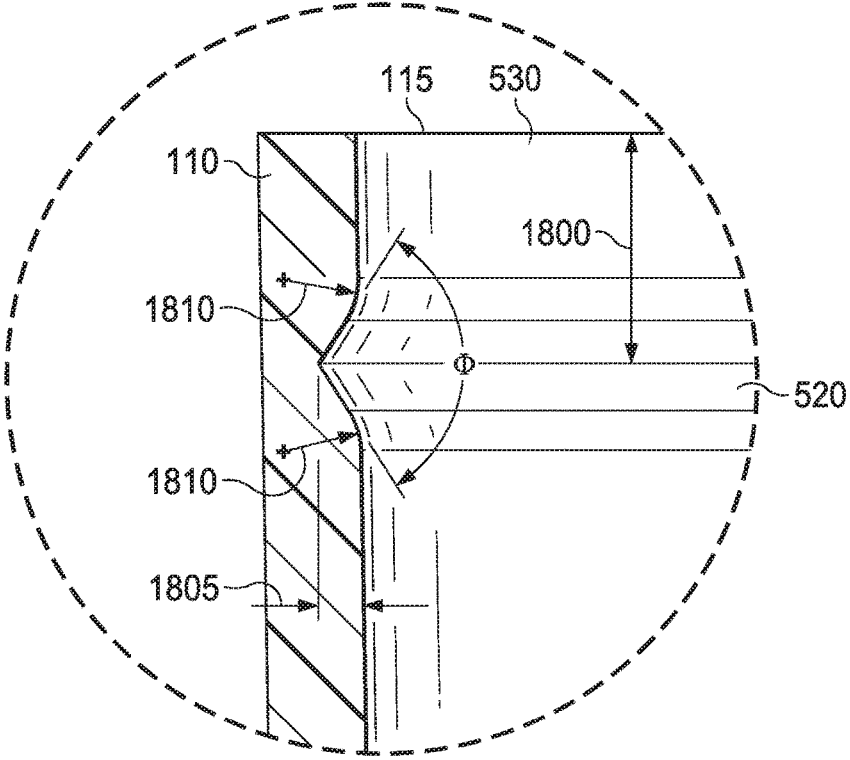
FIG. 18 is a detail view of the container of FIG. 16.

FIG. 18 is a detail view of a portion of the side wall 110 of the container 100 of FIG. 16, showing some additional details specific to the groove 520 and the lip 530. The groove 520 may have a centerline located a distance 1800 away from the first end 115. In some embodiments, the distance 1800 may range from about 0.09375 inches (about 2.4 millimeters) to about 0.28125 inches (about 7.1 millimeters). In some embodiments, the distance 1800 may be about 0.1875 inches (about 4.8 millimeters). In some embodiments, the distance 1800 may be equal to the distance 1715 of the vertex of the protrusion 147 so that the vertex of the protrusion 147 aligns with the centerline of the groove 520 when the cap 135 is closed. The groove 520 may have a depth 1805 at the centerline of the groove 520 into the side wall 110. In some embodiments, the depth 1805 may range from about 0.0156 inches (about 0.4 millimeters) to about 0.0625 inches (about 1.6 millimeters). In some embodiments, the depth 1805 may be about 0.03125 inches (about 0.8 millimeters). In some embodiments, the depth 1805 of the groove 520 may be equal to the length 1710 of the protrusion 147.

In some embodiments, the groove 520 may be V-shaped. The groove 520 may have walls angled at an angle 1. In some embodiments, the angle 1 may range from about 100 degrees to about 130 degrees. In some embodiments, the angle 1 may be about 115 degrees. Additionally, the groove 520 may include rounded edges at the transition into the groove 520 from the lip 530 and the transition out of the groove 520 to the side wall 110. The rounded edges may have a radius 1810 that may range from about 0.03125 inches (about 0.8 millimeters) to about 0.125 inches (about 3.2 millimeters). In some embodiments, the rounded edges may have a radius 1810 of about 0.0625 inches (about 1.6 millimeters). The V-shape and the rounded edges of the groove 520 and the triangular shape and rounded vertex of the protrusion 147 cooperate to allow smooth entry of the protrusion 147 into the groove 520 during closure of the cap 135 and smooth exit of the protrusion 147 out of the groove 520 during opening of the cap. The rounded vertex of the protrusion 147 may easily slide over the rounded edge of the groove 520 during opening and closing of the cap 135. The V-shape of the groove 520 may also sufficiently retain the triangular-shaped protrusion 147 in the groove 520 to keep the cap 135 closed, but does not require excessive force to be applied to the cap 135 to remove the protrusion 147 from the groove 520 when a user desires to open the cap 135. The V-shape and the rounded edges of the groove 520 and the triangular shape and rounded vertex of the protrusion 147 may facilitate opening the cap 135 with one hand. The closing mechanism, such as the protrusion 147 and the groove 520, may be configured to require an opening force greater than the force from the fishing lure 205 applied to the lid 135 when a tension to keep the container 100 secured to the fishing rod 405 is applied to the fishing line 215. Thus, the closing mechanism may be strong enough to keep the lid 135 closed when a tension is applied to the fishing line 215 to keep the container 100 secured to the fishing rod 405, but does not require an opening force that is too high to be applied by one hand.

In some example embodiments, the closing mechanism of the container 100 may include a first fastener element and a second fastener element. In some embodiments, the cap 135 includes the first fastener element and the side wall 110 includes a second fastener element, wherein the first fastener element and the second fastener element cooperate to maintain the cap 135 in a closed position. In some embodiments, the first fastener element is a male fastener and the second fastener element is a female fastener, the male fastener configured to be received in the female fastener. In some embodiments, the first fastener element is a female fastener and the second fastener element is a male fastener, the male fastener configured to be received in the female fastener. For example, the protrusion 147 may form the first fastener element and the groove 520 may form the second fastener element. The protrusion 147 may be a male fastener and the groove 520 may be a female fastener. Although the protrusion 147 is shown as extending from the hitch 145 and the groove 520 is shown extending into the side wall 110, in some embodiments, the groove 520 may extend into the hitch 145 and the protrusion 147 may extend from the side wall 110. In some embodiments, the male fastener may be disposed on the hitch 145 and the female fastener may be disposed on the side wall 110. In some embodiments, the female fastener may be disposed on the hitch 145 and the male fastener may be disposed on the side wall 110.

The apparatus for protecting fishing lures described herein may provide significant advantages. For example, the container 100 can significantly reduce or eliminate risks associated with fishing hooks, including hazards such as hook snags in the hand, foot, or clothing. The container 100 may be particularly advantageous for safely handling or storing hooks and lures such as top-water and crankbaits with treble-type hooks that are tied to a fishing line in a boat. The container 100 provides an easy-to-use device that may be operated with one hand, so as to allow a second hand to hold and steady a fishing rod and/or reel as well as the fishing line. The container 100 also may be both opened and closed using a single hand.

Thus, the container 100 may be held in one hand to more easily and in a controlled and coordinated fashion capture and enclose a fishing hook or lure while still attached to the fishing line of a fishing rod, which may be held and steadied in the other hand. The container 100 may further be tightly affixed to the fishing rod before releasing the container 100 from the hand. As a result, situations where a fishing lure with one or more hooks may be swinging around in the air and likely to snag on a person, nearby animal, or other object, may be avoided. Similarly, situations that require two hands to secure a fishing lure, while the fishing rod may be falling, crashing, or otherwise becoming unwieldy, may also be avoided. Additionally, the container 100 may be easily re-opened using one hand, and the fishing lure may be released for use. Moreover, the container 100 is aesthetically pleasing with significant ornamental features. For example, and without limitation, the tapered side wall 110, the hemispherical second end 120, the rounded edges 1100, and the portions of the edge 155 of the cap 135 that may be flush with the side wall 110 provide aesthetically pleasing shapes and features to the container 100.

While shown in a few illustrative embodiments, a person having ordinary skill in the art will recognize that the systems, apparatuses, and methods described herein are susceptible to various changes and modifications that fall within the scope of the appended claims. Moreover, descriptions of various alternatives using terms such as "or" do not require mutual exclusivity unless clearly required by the context, and the indefinite articles "a" or "an" do not limit the subject to a single instance unless clearly required by the context. Components may also be combined or eliminated in various configurations for the purposes of sale, manufacture, assembly, or use.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. A container for a fishing hook on a line, the container comprising:
    a body comprising a side wall defining a cavity having a longitudinal axis, a first open end, and a second closed end, the side wall comprising:
        a groove on an interior surface of the side wall, the groove located a distance from the first open end and extending partially around the interior surface of the side wall; and
        a recess on the interior surface of the side wall, the recess extending a depth from the first open end toward the second closed end, the recess having a first curved surface;
    a cap coupled to the first open end of the body, the cap configured to be disposed over the first open end to secure the fishing hook in the cavity, the cap comprising:
        a slot configured to receive the line;
        a first hitch extending from the cap, the first hitch having a first protrusion extending from the first hitch, wherein the first protrusion is configured to be received in the groove when the cap is closed, and wherein the first hitch includes one or more ribs extending from the cap to the first protrusion;
        a second hitch extending from the cap, the second hitch having a second protrusion extending from the second hitch, wherein the second protrusion is configured to be received in the groove when the cap is closed, and wherein the second hitch includes one or more ribs extending from the cap to the second protrusion; and
        a tab extending from the cap, the tab having a second curved surface, wherein the tab is configured to be received in the recess when the cap is closed; and
    a hook extending from the second closed end, wherein the hook is fixed in position on the second end.

2. The container of claim 1, wherein the slot is wedge-shaped.

3. The container of claim 1, wherein the cap further comprises one or more strengthening ribs.

4. The container of claim 1, further comprising a hinge coupling the cap to the body proximate to the first open end, and wherein the cap further comprises an overhang extending from the cap away from the hinge.

5. The container of claim 1, wherein the groove is V-shaped and the first protrusion and the second protrusion are triangular-shaped.

* * * * *